(12) United States Patent
Vymenets et al.

(10) Patent No.: US 11,765,269 B2
(45) Date of Patent: *Sep. 19, 2023

(54) TECHNOLOGIES FOR INCORPORATING AN AUGMENTED VOICE COMMUNICATION INTO A COMMUNICATION ROUTING CONFIGURATION

(71) Applicant: Genesys Cloud Services, Inc., Menlo Park, CA (US)

(72) Inventors: Leonid Vymenets, Markham (CA); Alexandria L. Hockeborn, Jacksonville, FL (US); Yong Guan, Markham (CA); Praphul Kumar, Chantilly, VA (US); Jason Chhaidan, Markham (CA)

(73) Assignee: Genesys Cloud Services, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,122

(22) Filed: Dec. 8, 2021

(65) Prior Publication Data
US 2022/0103685 A1 Mar. 31, 2022

Related U.S. Application Data

(63) Continuation of application No. 16/730,234, filed on Dec. 30, 2019, now Pat. No. 11,228,682.

(51) Int. Cl.
*H04M 3/51* (2006.01)
*G10L 13/00* (2006.01)
*G10L 13/033* (2013.01)

(52) U.S. Cl.
CPC .......... *H04M 3/5166* (2013.01); *G10L 13/00* (2013.01); *G10L 13/033* (2013.01); *H04M 3/5175* (2013.01); *H04M 2203/355* (2013.01)

(58) Field of Classification Search
CPC ............ H04M 3/5166; H04M 3/5175; H04M 2203/355; G10L 13/00; G10L 13/033
(Continued)

(56) References Cited

U.S. PATENT DOCUMENTS 7,092,888 B1 8/2006 McCarthy et al.
7,835,911 B2 11/2010 Balchandran et al.
(Continued)

OTHER PUBLICATIONS

Lyrebird: Ultra-realistic voice cloning and text to speech; https://www.descript.com/lyrebird-ai?source=lyrebird; Dec. 30, 2019; 5 pages.
(Continued)

*Primary Examiner* — Binh Kien Tieu
(74) *Attorney, Agent, or Firm* — Taft Stettinius & Hollister LLP

(57) ABSTRACT

A method for incorporating an augmented voice communication into a communication routing configuration of a contact center system according to an embodiment includes selecting a vocal avatar, wherein the vocal avatar includes phonetic characteristics having first values, receiving a text communication and input user parameters from an input user, generating the augmented voice communication based on the text communication and the input user parameters, wherein the augmented voice communication includes phonetic characteristics having second values, wherein the first values of the phonetic characteristics of the vocal avatar are different from the second values of the phonetic characteristics of the augmented voice communication, and incorporating the augmented voice communication into the communication routing configuration of the contact center system.

20 Claims, 19 Drawing Sheets

(58) Field of Classification Search
USPC .................................................. 379/88.18
See application file for complete search history.

(56) References Cited

U.S. PATENT DOCUMENTS

| | | | | |
|---|---|---|---|---|
| 8,131,524 | B2* | 3/2012 | Bushey | G06Q 10/10 |
| | | | | 704/4 |
| 8,285,549 | B2* | 10/2012 | Teegan | G10L 13/033 |
| | | | | 704/260 |
| 9,191,620 | B1 | 11/2015 | Katzer et al. | |
| 10,192,543 | B2* | 1/2019 | Balchandran | G06F 40/40 |
| 11,228,682 | B2* | 1/2022 | Vymenets, Jr. | G10L 13/00 |
| 2003/0235341 | A1 | 12/2003 | Gokturk et al. | |
| 2011/0082807 | A1* | 4/2011 | Parekh | G06Q 50/01 |
| | | | | 705/319 |
| 2014/0095397 | A1* | 4/2014 | Phillips | G06Q 10/0639 |
| | | | | 705/304 |
| 2014/0314225 | A1* | 10/2014 | Riahi | H04L 51/02 |
| | | | | 379/265.09 |
| 2015/0127350 | A1* | 5/2015 | Agiomyrgiannakis | |
| | | | | G10L 13/02 |
| | | | | 704/235 |
| 2019/0158671 | A1* | 5/2019 | Feast | G06Q 10/10 |
| 2020/0177730 | A1* | 6/2020 | Dutta | H04M 7/0027 |
| 2020/0250874 | A1* | 8/2020 | Assouline | G06N 3/08 |

OTHER PUBLICATIONS

Voice Cloning/iSpeech; https://www.ispeech.org/voice-cloning; Dec. 30, 2019; 7 pages; Copyright 2009-2018 iSpeech, Inc.

* cited by examiner

FIG. 9

Designer Applications Shared Modules Media Resources Digital Resources Speech Grammars Analytics Business Controls˅ Admin˅ Operations˅ | ⊚ voice 3539 admin˅ | ⚙ ?

Media Resources / 916
Media Collections

🔍 Search          + Add New Voice

| ☐ | Name | Description | Last Modified | Last Published | Tags | | |
|---|---|---|---|---|---|---|---|
| ☐ | Voice Sample 1 | This voice signature has been created for call menu 1. | 10/23/2018 | 10/23/2018 | Testing | Chatbots | | |
| ☐ | Voice Sample 2 | This voice signature has been created for call menu 2. | 09/28/2018 | 09/28/2018 | Testing | Predictive Routing | Chatbots | |
| ☐ | Voice Sample 3 | This voice signature has been created for call menu 3. | 09/27/2018 | 09/27/2018 | Testing | Samples | | |
| ☐ | Voice Sample 4 | This voice signature has been created for call menu 4. | 09/14/2018 | 09/14/2018 | Testing | Chatbots | | |
| ☐ | Voice Sample 5 | This voice signature has been created for call menu 5. | 09/12/2018 | 09/12/2018 | Testing | Samples | Predictive Routing | Chatbots |
| ☐ | Voice Sample 6 | This voice signature has been created for call menu 6. | 08/31/2018 | 08/31/2018 | Testing | Predictive Routing | | |
| ☐ | Voice Sample 7 | This voice signature has been created for call menu 7. | 07/05/2018 | 07/05/2018 | Testing | Samples | Predictive Routing | Chatbots |
| ☐ | Voice Sample 8 | This voice signature has been created for call menu 8. | 06/13/2018 | 06/13/2018 | Testing | Predictive Routing | | |
| ☐ | Voice Sample 9 | This voice signature has been created for call menu 9. | 01/04/2018 | 01/04/2018 | Testing | Samples | | |
| ☐ | Voice Sample 10 | This voice signature has been created for call menu 10. | 11/01/2017 | 11/01/2017 | Testing | Chatbots | | |
| ☐ | Voice Sample 11 | This voice signature has been created for call menu 11. | 10/25/2017 | 10/25/2017 | Testing | Samples | Predictive Routing | Chatbots |
| ☐ | Voice Sample 12 | This voice signature has been created for call menu 12. | 10/24/2017 | 10/24/2017 | Testing | | | |
| ☐ | Voice Sample 13 | This voice signature has been created for call menu 13. | 10/24/2017 | 10/24/2017 | Testing | Samples | Predictive Routing | |
| ☐ | Voice Sample 14 | This voice signature has been created for call menu 14. | 10/13/2017 | 10/13/2017 | Testing | Samples | | |
| ☐ | Voice Sample 15 | This voice signature has been created for call menu 15. | 10/13/2017 | 10/13/2017 | Testing | Samples | Predictive Routing | Chatbots |
| ☐ | Voice Sample 16 | This voice signature has been created for call menu 16. | 10/13/2017 | 10/13/2017 | Testing | Chatbots | | |
| ☐ | Voice Sample 17 | This voice signature has been created for call menu 17. | 10/13/2017 | 10/13/2017 | Testing | Samples | Predictive Routing | |
| ☐ | Voice Sample 18 | This voice signature has been created for call menu 18. | 10/13/2017 | 10/13/2017 | Testing | | | |
| ☐ | Voice Sample 19 | This voice signature has been created for call menu 19. | 10/13/2017 | 10/13/2017 | Testing | Predictive Routing | | |

1-19 of 19 [25 ˅] per page                 « < Page [1] of 1 > »

| | | | | | | |
|---|---|---|---|---|---|---|
| ☐ | Claims_GBC_New Claim 2 | Menu Option 16 | | | | |
| ☐ | Claims_GBC_Main Menu THAW 2 | Menu Option 17 | Testing | Samples | Predictive Routing | |
| ☐ | Claims_GBC_Telephonic Inquiry 2 | Menu Option 18 | | | | |
| ☐ | Claims_GBC_Generic Disclaimer 3 | Menu Option 19 | Samples | Predictive Routing | | |
| ☐ | Claims_GBC_Spanish Disclaimer 3 | Menu Option 20 | Testing | | | |
| ☐ | Claims_GBC_Spanish Existing_Claim | Menu Option 21 | Testing | Samples | Predictive Routing | |

1-19 of 19  [25 ▾] per page     page [1] of 1

TECHNOLOGIES FOR INCORPORATING AN AUGMENTED VOICE COMMUNICATION INTO A COMMUNICATION ROUTING CONFIGURATION

BACKGROUND

Contact centers handle large amounts of interaction between end users and organizations. Routing configurations may be created for contact centers to route communications received by contact centers. Some routing configurations include prerecorded messages, which may be selected from multiple-choice menu messages (e.g., "press 1 to be routed to X" or "press 2 to be routed to Y") and/or from custom voice recorded messages made by hired voice actors. However, multiple-choice menu messages may be perceived by end users as being confusing, time consuming, and unsympathetic of end user issues. Additionally, hiring voice actors is expensive and neither a scalable nor quick/efficient solution. For example, voice actor prerecorded messages do not scale easily over time, location, mood, etc. End users residing in a particular location of a country or territory may speak a slang, language, or dialect that is different from end users residing in another location. Similarly, voice actors are expensive and require significant time to produce prerecorded messages. Voice actors also may not be available or may become sick or may quit, which may result in voice inconsistency. Voice inconsistency may be problematic for organizations seeking alignment of brand and voice. For an organization that desires to uphold its brand recognition and strength, such voice inconsistency may hinder its brand image as well as its viability to scale its messaging to end users quickly and efficiently.

SUMMARY

According to an embodiment, a method for incorporating an augmented voice communication into a communication routing configuration of a contact center system includes selecting a vocal avatar, wherein the vocal avatar includes phonetic characteristics having first values, receiving a text communication and input user parameters from an input user, generating the augmented voice communication based on the text communication and the input user parameters, wherein the augmented voice communication includes phonetic characteristics having second values, wherein the first values of the phonetic characteristics of the vocal avatar are different from the second values of the phonetic characteristics of the augmented voice communication, and incorporating the augmented voice communication into the communication routing configuration of the contact center system.

In some embodiments, the method may further include obtaining one or more end user parameters, wherein the vocal avatar is selected in response to obtaining the one or more end user parameters.

In some embodiments, the method may further include receiving an end user communication from an end user and routing the end user communication to an automated chat resource based on the one or more end user parameters, wherein the automated chat resource uses the augmented voice communication to engage in an automated chat communication session with the end user.

In some embodiments, the method may further include monitoring the automated chat communication session between the end user and the automated chat resource and redirecting the automated chat communication session to a contact center resource other than the automated chat resource in response to a trigger event detected during the monitoring of the automated chat communication session.

In some embodiments, the method may further include playing the augmented voice communication, determining that the augmented voice communication is not complete, and generating a second augmented voice communication based on second input user parameters in response to determining that the augmented voice communication is not complete, wherein the second augmented voice communication includes phonetic characteristics having third values, and wherein the first values of the phonetic characteristics of the vocal avatar are different from the third values of the phonetic characteristics of the second augmented voice communication.

In some embodiments, the one or more end user parameters may include profile information or demographic information corresponding to the end user.

In some embodiments, the one or more end user parameters may include at least one of an end user location, an end user language, an end user disabilities, an end user ethnicity, an end user mood, an end user gender, an end user age, an end user dialect, an end user slang, an end user diction, an end user satisfaction, or an end user personality characteristic.

In some embodiments, the phonetic characteristics may include at least one of a pitch, a tone, a mood, a gesture, or a conversation style.

In some embodiments, the input user parameters may augment the first values of the phonetic characteristics of the vocal avatar resulting in the second values of the phonetic characteristics of the augmented voice communication being different from the first values of the phonetic characteristics of the vocal avatar.

According to another embodiment, a method for incorporating an augmented voice communication into a communication routing configuration of a contact center system may include receiving an end user communication from an end user, obtaining one or more end user parameters, routing the end user communication to an automated chat resource based on the one or more end user parameters, selecting a vocal avatar by the automated chat resource, wherein the vocal avatar includes phonetic characteristics having first values, receiving a text communication and input user parameters from the automated chat resource, and generating the augmented voice communication based on the text communication and the input user parameters, wherein the augmented voice communication includes phonetic characteristics having second values, wherein the first values of the phonetic characteristics of the vocal avatar are different from the second values of the phonetic characteristics of the augmented voice communication, and the automated chat resource may use the augmented voice communication to engage in an automated chat communication session with the end user.

In some embodiments, the one or more end user parameters may include profile information or demographic information corresponding to the end user.

In some embodiments, the phonetic characteristics may include at least one of a pitch, a tone, a mood, a gesture, or a conversation style.

In some embodiments, the input user parameters may augment the first values of the phonetic characteristics of the vocal avatar resulting in the second values of the phonetic characteristics of the augmented voice communication being different from the first values of the phonetic characteristics of the vocal avatar.

In some embodiments, the method may further include monitoring the automated chat communication session between the end user and the automated chat resource and redirecting the automated chat communication session to a contact center resource other than the automated chat resource in response to detecting a trigger event during the monitoring of the automated chat communication session.

In some embodiments, a system for incorporating an augmented voice communication into a communication routing configuration of a contact center system may include at least one processor and at least one memory comprising a plurality of instructions stored thereon that, in response to execution by the at least one processor, causes the system to select a vocal avatar, wherein the vocal avatar includes phonetic characteristics having first values, receive a text communication and input user parameters from an input user, generate the augmented voice communication based on the text communication and the input user parameters, wherein the augmented voice communication includes phonetic characteristics having second values, wherein the first values of the phonetic characteristics of the vocal avatar are different from the second values of the phonetic characteristics of the augmented voice communication, incorporate the augmented voice communication into the communication routing configuration of the contact center system.

In some embodiments, the system may further include an end user device, and the plurality of instructions may further cause the system to receive an end user communication from an end user utilizing the end user device, obtain one or more end user parameters, and route the end user communication to an automated chat resource based on the one or more end user parameters, wherein the automated chat resource uses the augmented voice communication to engage in an automated chat communication session with the end user.

In some embodiments, the plurality of instructions may further cause the system to monitor the automated chat communication session between the end user and the automated chat resource and redirect the automated chat communication session to a contact center resource other than the automated chat resource in response to detection of a trigger event while the system monitors the automated chat communication session.

In some embodiments, the one or more end user parameters may include profile information or demographic information corresponding to the end user.

In some embodiments, the phonetic characteristics may include at least one of a pitch, a tone, a mood, a gesture, or a conversation style.

In some embodiments, the input user parameters may augment the first values of the phonetic characteristics of the vocal avatar resulting in the second values of the phonetic characteristics of the augmented voice communication being different from the first values of the phonetic characteristics of the vocal avatar.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIGS. 9-17 illustrate various states of at least one embodiment of a graphical user interface of an application executed by the system of FIG. 1.

DETAILED DESCRIPTION

Figure 1:
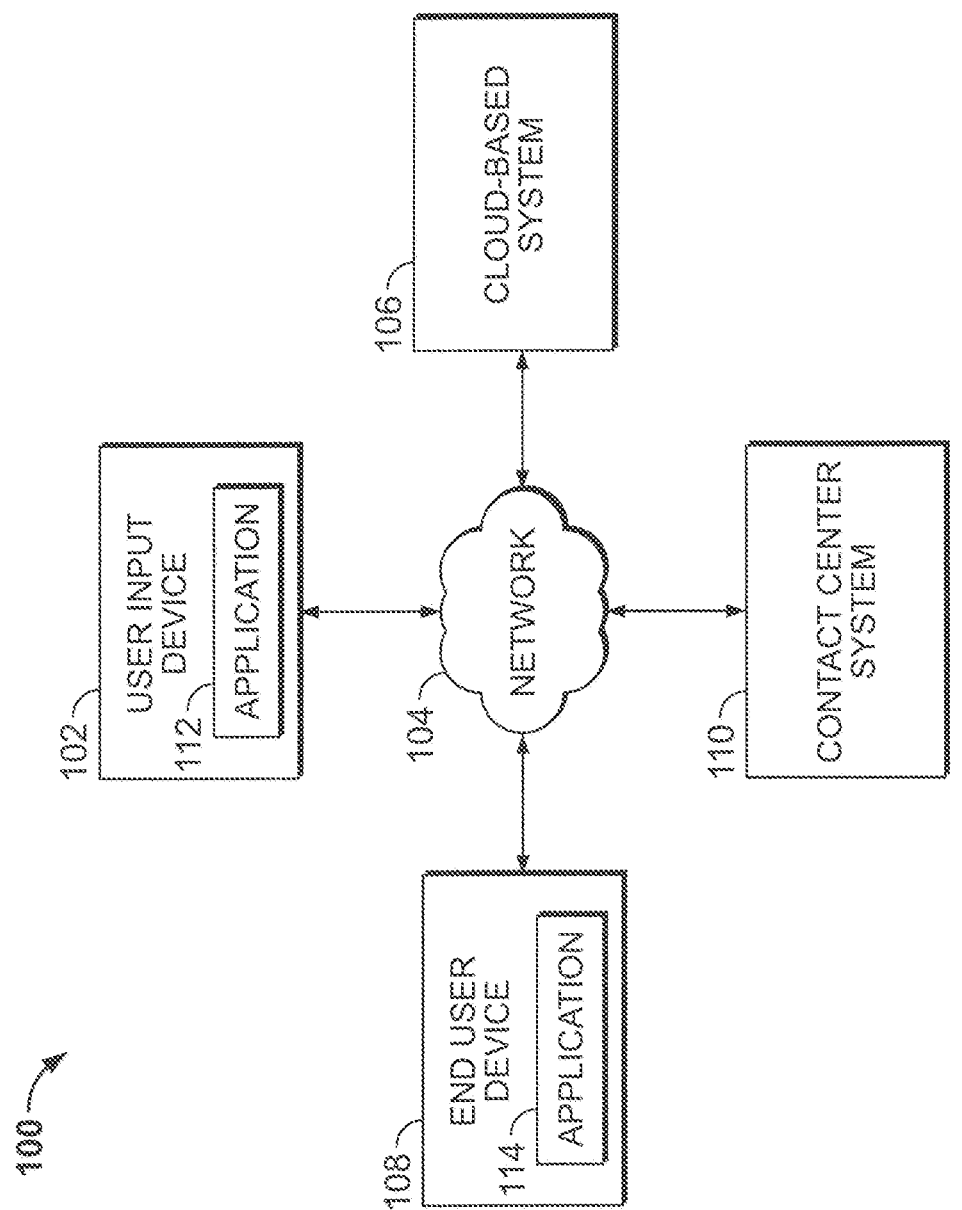
FIG. 1 is a simplified block diagram of at least one embodiment of a system for incorporating an augmented voice communication into a communication routing configuration.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for incorporating an augmented voice communication into a communication routing configuration includes a user input device 102, a network 104, a cloud-based system 106, an end user device 108, and a contact center system 110. Although only one user input device 102, one network 104, one cloud-based system 106, one end user device 108, and one contact center system 110 are shown in the illustrative embodiment of FIG. 1, the system 100 may include multiple user input devices 102, networks 104, cloud-based systems 106, end user devices 108, and/or contact center systems 110 in other embodiments. For example, in some embodiments, multiple cloud-based systems 106 (e.g., related or unrelated systems) may be used to perform the various functions described herein. Further, as described herein, multiple user input devices 102 and/or end user devices 108 may be used to access, for example, a web-based graphical user interface (e.g., the graphical user interface 900 of FIGS. 9-17) that permits input users to generate and incorporate various augmented voice communications into a communication routing configuration of multiple contact center systems 110.

It should be appreciated that the system 100 and technologies described herein may allow the quick and efficient creation of vocal avatars. The vocal avatars may be either pre-canned vocal avatars or custom made vocal avatars. The system 100 may also generate augmented voice communications based on the pre-canned and/or custom vocal avatars. In some embodiments, the system 100 may edit previously generated augmented voice communications. The vocal avatars and augmented voice communications may be used within the contact center system 110. A benefit of using vocal avatars and augmented voice communications, according to some embodiments, may be that such vocal avatars and augmented voice communications may be created to sound like (e.g., identical or similar to) a certain human or character (e.g., a fictional cartoon, animated character, or anthropomorphized animal/object), which may reduce the need to hire separate voice actors to create prerecorded messages. The system 100 may be used to allow the contact center system 110 to generate augmented voice communications in real-time. Another benefit, according to some embodiments, may be that the system 100 may allow input users to augment the mood, pitch, tone, gestures, and conversation style of words or phrases of a vocal avatar or augmented voice communication (from a text communication and certain input user parameters) dynamically and/or in real time. In some embodiments, the system may incorporate augmented voice communications into the communication routing configurations of the contact center system 110. The system 100 may allow the selection and creation/customization of a diverse assortment of augmented voice communications to be used during script playback in a communications routing configuration in the contact center system 110. The incorporation of such functionality within a communication routing configuration may allow contact center systems to easily extend the range of augmented voice communications used during an automated chat resource communication session, which may be used to enhance voice self-service in the contact center system 110.

It should be appreciated that the user input device 102, network 104, cloud-based system 106, end user device 108, and contact center system 110 may be embodied as any type of device/system or collection of devices/systems suitable for performing the functions described herein. More specifically, in the illustrative embodiment, the user input device 102 and/or the end user device 108 may be a voice communications device, such as a telephone, a cellular phone, or a satellite phone. The user input device 102 and/or the end user device 108 alternatively may be, for example, an electronic tablet, an electronic book reader, a personal digital assistant (PDA), a portable music player, or a computer capable of communication with the cloud-based system 106. The user input device 102 and/or the end user device 108 may have various input/output devices with which a user may interact to provide and receive audio, text, video, and other forms of data. The user input device 102 and/or the end user device 108 may allow an end user to interact with the cloud-based system 106 over the network 104.

In some embodiments, the user input device 102 and/or the end user device 108 may be embodied as any type of device capable of executing an application and otherwise performing the functions described herein. For example, in the illustrative embodiment, the user input device 102 may be configured to execute an application 112, and the end user device 108 may configured to execute an application 114. It should be appreciated that each of the applications 112, 114 may be embodied as any type of application suitable for performing the functions described herein. In particular, in some embodiments, one or more of the applications 112, 114 may be embodied as a mobile application (e.g., a smartphone application), a cloud-based application, a web application, a thin-client application, and/or another type of application. For example, in some embodiments, one or more of the applications 112, 114 may serve as a client-side interface (e.g., via a web browser) for a web-based application or service. Additionally, although only one application 112, 114 is shown as being executed by the corresponding devices 102, 108, it should be appreciated that each of the devices 102, 108 may be configured to execute other applications in order to perform the functions described herein.

As described herein, in some embodiments, an input user may interact with the user input device 102 via a graphical user interface (GUI) of the application 112 (e.g., the graphical user interface 900 of FIGS. 9-17) in order to create a vocal avatar to be used to generate an augmented voice communication (e.g., via the cloud-based system 106) for incorporation into a communication routing configuration of the contact center system 110 as described herein.

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108, 110 of the system 100. It should be appreciated that the various devices/systems 102, 106, 108, 110 may communicate with one another via different networks 104 depending on the source and/or destination devices 102, 106, 108, 110. Further, in some embodiments, one or more of the devices/systems 102, 106, 108, 110 may not be configured to communicate with another of the devices/systems 102, 106, 108, 110 via the network 104.

The contact center system 110 may be embodied as any system capable of providing contact center services (e.g., call center services) to an end user and otherwise performing the functions described herein. Depending on the particular embodiment, it should be appreciated that the contact center system 110 may be located on the premises of the organization utilizing the contact center system 110 and/or located remotely relative to the organization (e.g., in a cloud-based computing environment). In some embodiments, a portion of the contact center system 110 may be located on the organization's premises/campus while other portions of the contact center system 110 are located remotely relative to the organization's premises/campus. As such, it should be appreciated that the contact center system 110 may be deployed in equipment dedicated to the organization or third-party service provider thereof and/or deployed in a remote computing environment such as, for example, a private or public cloud environment with infrastructure for supporting multiple contact centers for multiple enterprises. In some embodiments, the contact center system 110 includes resources (e.g., personnel, computers, and telecommunication equipment) to enable delivery of services via telephone and/or other communication mechanisms. Such services may include, for example, technical support, help desk support, emergency response, and/or other contact center services depending on the particular type of contact center.

The cloud-based system 106 may be embodied as any one or more types of devices/systems that are capable of performing the functions described herein. In the illustrative embodiment, the cloud-based system 106 is embodied as a cloud-based system executing in a cloud computing environment; however, it should be appreciated that, in other embodiments, the cloud-based system 106 or a portion thereof (e.g., one or more of the border communications device 202, the SIP server 204, the resource manager 206, the media control platform 208, the speech/text analytics system 210, the voice signature generator 212, the voice data storage 214, the voice generator 216, the voice gateway 218, the media augmentation system 220, and/or the chat bot 222, and/or one or more portions thereof) may be embodied as one or more systems executing outside of a cloud computing environment.

In cloud-based embodiments, one or more of the cloud-based system 106, the border communications device 202, the SIP server 204, the resource manager 206, the media control platform 208, the speech/text analytics system 210, the voice signature generator 212, the voice data storage 214, the voice generator 216, the voice gateway 218, the media augmentation system 220, and/or the chat bot 222 (and/or one or more portions thereof) may be embodied as a server-ambiguous computing solution, for example, that executes a plurality of instructions on-demand, contains logic to execute instructions only when prompted by a particular activity/trigger, and does not consume computing resources when not in use. That is, the cloud-based system 106, the border communications device 202, the SIP server 204, the resource manager 206, the media control platform 208, the speech/text analytics system 210, the voice signature generator 212, the voice data storage 214, the voice generator 216, the voice gateway 218, the media augmentation system 220, and/or the chat bot 222 (and/or one or more portions thereof) may be embodied as a virtual computing environment residing "on" a computing system (e.g., a distributed network of devices) in which various $3^{rd}$ party virtual functions may be executed corresponding with the functions of the cloud-based system 106, the border communications device 202, the SIP server 204, the resource manager 206, the media control platform 208, the speech/text analytics system 210, the voice signature generator 212, the voice data storage 214, the voice generator 216, the voice gateway 218, the media augmentation system 220, and/or the chat bot 222 (and/or one or more portions thereof) described herein. For example, when an event occurs (e.g., data is transferred to the cloud-based system 106 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made (e.g., via an appropriate user interface to the cloud-based system 106), the appropriate virtual function(s) may be executed to perform the actions before eliminating the instance of the virtual function(s).

Figure 2:
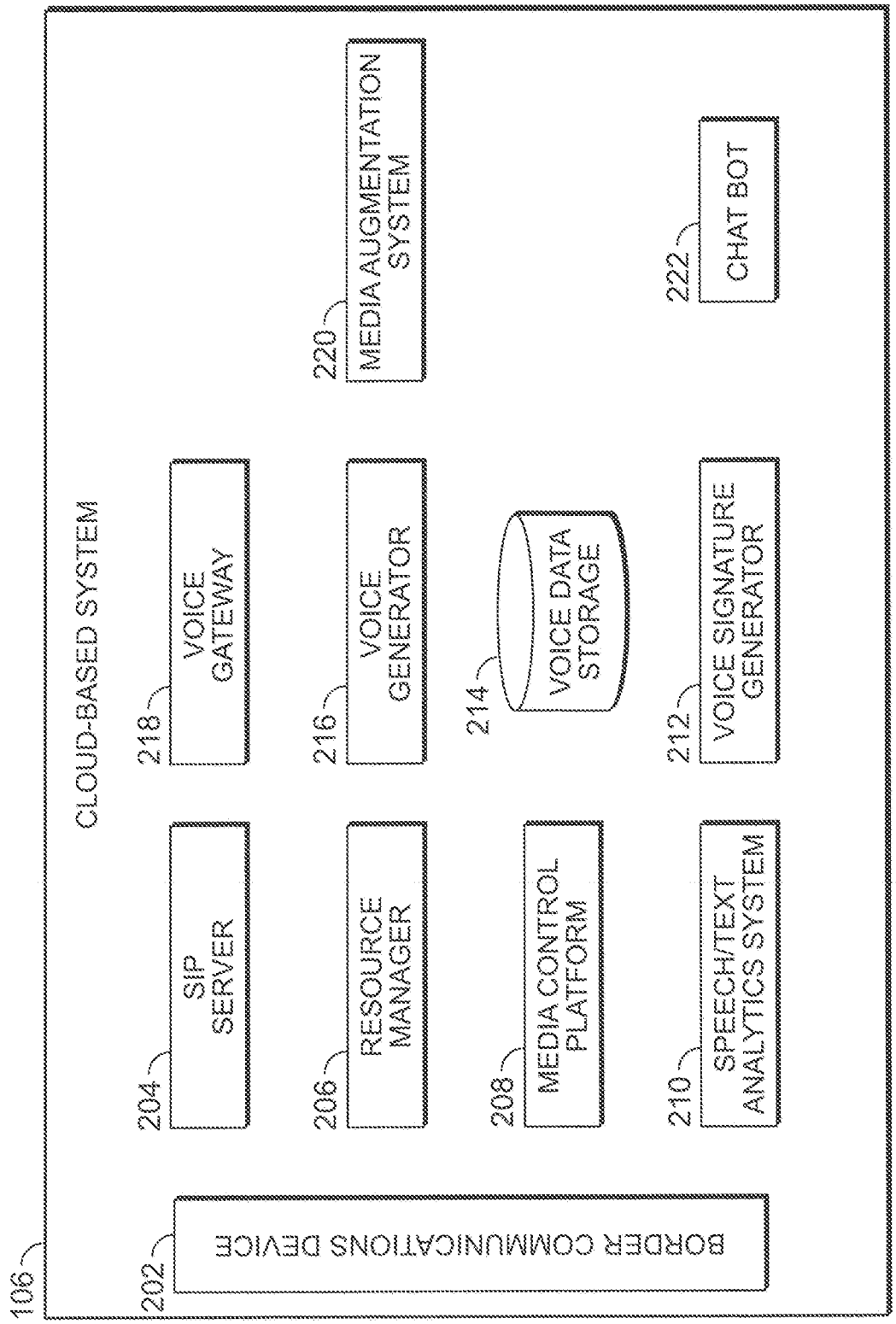
FIG. 2 is a simplified block diagram of at least one embodiment of a cloud-based system of the system of FIG. 1 for incorporating an augmented voice communication into a communication routing configuration.

Referring now to FIG. 2, the border communication device 202 may be embodied as any one or more types of devices/systems that are capable of performing the functions described herein. For example, in some embodiments, the border communication device 202 may be configured to control signaling and media streams involved in setting up, conducting, and tearing down voice conversations and other media communications between, for example, an end user and contact center system. According to some embodiments, the border communication device 202 may be a session border controller (SBC) controlling the signaling and media exchanged during a media session (also referred to as a "call," "telephony call," or "communication session") between the end user and contact center system. According to some embodiments, the signaling exchanged during a media session may include SIP, H.323, Media Gateway Control Protocol (MGCP), and/or any other voice-over IP (VoIP) call signaling protocols. The media exchanged during a media session may include media streams that carry the call's audio, video, or other data along with information of call statistics and quality.

According to some embodiments, the border communication device 202 may operate according to a standard SIP back-to-back user agent (B2BUA) configuration. In this regard, the border communication device 202 may be inserted in the signaling and media paths established between a calling and called parties in a VoIP call. In some embodiments, it should be understood that other intermediary software and/or hardware devices may be invoked in establishing the signaling and/or media paths between the calling and called parties.

According to some embodiments, the border communication device 202 may exert control over the signaling (e.g., SIP messages) and media streams (e.g., RTP data) routed to and from the end user device 108 and the contact center system 110 that traverse the network 104. In this regard, the border communication device 202 may be coupled to trunks that carry signals and media for calls to and from the end user device 108 over the network 104, and to trunks that carry signals and media to and from the contact center system 110 over the network 104.

The SIP server 204 may be embodied as any one or more types of devices/systems that are capable of performing the functions described herein. For example, in some embodiments, the SIP server 204 may act as a SIP B2UBA and may control the flow of SIP requests and responses between SIP endpoints. Any other controller configured to set up and tear down VoIP communication sessions may be contemplated in addition to or in lieu of the SIP server 204 in other embodiments. The SIP server 204 may be a separate logical component or may be combined with the resource manager 206. In some embodiments, the SIP server 204 may be hosted at the contact center system 110. Although a SIP server 204 is used in the illustrative embodiment, any other call server configured with any other VoIP protocol may be used in addition to or in lieu of SIP, such as, for example, H.232 protocol, Media Gateway Control Protocol, Skype protocol, and/or other suitable technologies in other embodiments.

The resource manager 206 may be embodied as any one or more types of devices/systems that are capable of performing the functions described herein. In the illustrative embodiment, the resource manager 206 may be configured to allocate and monitor a pool of media control platforms for providing load balancing and high availability for each resource type. According to some embodiments, the resource manager 206 may monitor and may select a media control platform 208 from a cluster of available platforms. The selection of the media control platform 208 may be dynamic, for example, based on identification of a location of a calling end user, type of media services to be rendered, detected quality of a current media service, and/or other factors.

According to some embodiments, the resource manager 206 may be configured to process requests for media services, and interact with, for example, a configuration server having a configuration database, to determine an interactive voice response (IVR) profile, voice application (e.g. Voice Extensible Markup Language (Voice XML) application), announcement, and conference application, resource, and service profile that can deliver the service, such as, for example, a media control platform. According to some embodiments, the resource manager may provide hierarchical multi-tenant configurations for service providers, enabling them to apportion a select number of resources for each tenant.

According to some embodiments, the resource manager 206 may be configured to act as a SIP proxy, a SIP registrar, and/or a SIP notifier. In this regard, the resource manager 206 may act as a proxy for SIP traffic between two SIP components. As a SIP registrar, the resource manager 206 may accept registration of various resources via, for example, SIP REGISTER messages. In this manner, the cloud-based system 106 may support transparent relocation of call-processing components. In some embodiments, components such as the media control platform 208 do not register with the resource manager 206 at startup. The resource manager 206 may detect instances of the media control platform 208 through configuration information retrieved from the configuration database. If the media control platform 208 has been configured for monitoring, the resource manager 206 may monitor resource health by using, for example, SIP OPTIONS messages. In some embodiments, to determine whether the resources in the group are alive, the resource manager 206 may periodically send SIP OPTIONS messages to each media control platform 208 resource in the group. If the resource manager 206 receives an OK response, the resources are considered alive. It should be appreciated that the resource manager 206 may be configured to perform other various functions, which have been omitted for brevity of the description. The resource manager 206 and the media control platform 208 may collectively be referred to as a media controller.

According to some embodiments, the resource manager 206 may act as a SIP notifier by accepting, for example, SIP SUBSCRIBE requests from the SIP server 204 and maintaining multiple independent subscriptions for the same or different SIP devices. The subscription notices are targeted for the tenants that are managed by the resource manager 206. In this role, the resource manager 206 may periodically generate SIP NOTIFY requests to subscribers (or tenants) about port usage and the number of available ports. The resource manager 206 may support multi-tenancy by sending notifications that contain the tenant name and the current status (in- or out-of-service) of the media control platform 208 that is associated with the tenant, as well as current capacity for the tenant.

The media control platform 208 may be embodied as any service or system capable of providing media services and otherwise performing the functions described herein. For example, in some embodiments, the media control platform 208 may be configured to provide call and media services upon request from a service user. Such services may include, without limitation, initiating outbound calls, playing music or providing other media while a call is placed on hold, call recording, conferencing, call progress detection, playing audio/video prompts during a customer self-service session, and/or other call and media services. One or more of the services may be defined by voice applications (e.g. VoiceXML applications) that are executed as part of the process of establishing a media session between the media control platform 208 and the end user.

The speech/text analytics system (STAS) 210 may be embodied as any service or system capable of providing various speech analytics and text processing functionalities (e.g., text-to-speech) as will be understood by a person of skill in the art and otherwise performing the functions described herein. The speech/text analytics system 210 may perform automatic speech and/or text recognition and grammar matching for end user communications sessions that are handled by the cloud-based system 106. The speech/text analytics system 210 may include one or more processors and instructions stored in machine-readable media that are executed by the processors to perform various operations. In some embodiments, the machine-readable media may include non-transitory storage media, such as hard disks and hardware memory systems.

The voice signature generator 212 may be embodied as any service or system capable of creating a vocal avatar and otherwise performing the functions described herein. The voice signature generator 212 may be configured to receive and record voice communication samples. The voice signature generator 212 may also be configured to create a vocal avatar from recorded voice samples. In other embodiments, it should be appreciated that the voice signature generator 212 may, additionally or alternatively, include other types of systems of creating vocal avatars for processing by the cloud-based system 106 and/or other devices of the system 100.

The voice data storage 214 may be embodied as one or more databases, data structures, and/or data storage devices capable of storing data in the cloud-based system 106 or otherwise facilitating the storage of such data for the cloud-based system 106. For example, in some embodiments, the voice data storage 214 may include one or more cloud storage buckets. In other embodiments, it should be appreciated that the voice data storage 214 may, additionally or alternatively, include other types of voice data storage mechanisms that allow for dynamic scaling of the amount of data storage available to the cloud-based system 106. In some embodiments, the voice data storage 214 may store scripts (e.g., pre-programmed scripts or otherwise). In some embodiments, the voice data storage 214 may store vocal avatars and/or augmented voice communications. The voice data storage 214 may also be embodied as any device or component, or collection of devices or components, capable of short-term or long-term storage of data. Although the voice data storage 214 is described herein as data storages and databases, it should be appreciated that the voice data storage 214 may include both a database (or other type of organized collection of data and structures) and data storage for the actual storage of the underlying data. The voice data storage 214 may store various data useful for performing the functions described herein. As described herein, in some embodiments, the voice data storage 214 may be used to store vocal avatars (e.g., vocal avatars created by the voice signature generator 212) and/or augmented voice communications (e.g., augmented voice communications created by the voice generator 216).

The voice generator 216 may be embodied as any service or system capable of generating a voice communication (e.g., an augmented voice communication) and otherwise performing the functions described herein. In some embodiments, the voice generator 216 may generate the voice communication based on a particular voice signature. The voice generator 216 may also be configured to generate an augmented voice communication. In other embodiments, it should be appreciated that the voice generator 216 may, additionally or alternatively, include other types of systems of generating augmented voice communications for processing by the cloud-based system 106 and/or other devices of the system 100.

The voice gateway 218 may be embodied as any service or system capable of performing the functions described herein. In the illustrative embodiment, the voice gateway 218 receives end user calls from or places calls to voice communications devices, such as the end user device 108, and responds to the calls in accordance with a voice program that corresponds to a communication routing configuration of the contact center system 110. In some embodiments, the voice program may include a voice avatar or an augmented voice communication. The voice program may be accessed from local memory within the voice gateway 218 or from other storage media in the cloud-based system 106. In some embodiments, the voice gateway 218 may process voice programs that are script-based voice applications. The voice program, therefore, may be a script written in a scripting language, such as voice extensible markup language (VoiceXML) or speech application language tags (SALT). The cloud-based system 106 may also communicate with the voice data storage 214 to read and/or write user interaction data (e.g., state variables for a data communications session) in a shared memory space.

The media augmentation system 220 may be embodied as any service or system capable of specifying how the portions of the cloud-based system 106 (e.g., one or more of the border communications device 202, the SIP server 204, the resource manager 206, the media control platform 208, the speech/text analytics system 210, the voice signature generator 212, the voice data storage 214, the voice generator 216, the voice gateway 218, the media augmentation system 220, and/or the chat bot 222, and/or one or more portions thereof) interact with each other and otherwise performing the functions described herein. In some embodiments, the media augmentation system 220 may be embodied as or include an application program interface (API). In some embodiments, the media augmentation system 220 enables integration of differing parameters and/or protocols that are used with various planned application and media types utilized within the cloud-based system 106.

The chat bot 222 may be embodied as any automated service or system capable of using automation to engage with end users and otherwise performing the functions described herein. For example, in some embodiments, the chat bot 222 may operate, for example, as an executable program that can be launched according to demand for the particular chat bot. In some embodiments, the chat bot 222 simulates and processes human conversation (either written or spoken), allowing humans to interact with digital devices as if the humans were communicating with another human. In some embodiments, the chat bot 222 may be as simple as rudimentary programs that answer a simple query with a single-line response, or as sophisticated as digital assistants that learn and evolve to deliver increasing levels of personalization as they gather and process information. In some embodiments, the chat bot 222 includes and/or leverages artificial intelligence, adaptive learning, bots, cognitive computing, and/or other automation technologies. In some embodiments, the chat bot 222 may leverage one or more machine learning and/or artificial intelligence techniques to determine the best selection of vocal avatars and/or augmented voice communications. For example, in some embodiments, the chat bot 222 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms, artificial intelligence, and/or other suitable machine learning algorithms, artificial intelligence algorithms, techniques, and/or mechanisms.

In one embodiment, the number of chat bots 222 may vary according to the design and function of a chat automation server, and is not limited to the number illustrated in FIG. 2. For example, different chat bots 222 may be created to have different profiles. The profile of a particular chat bot may be used to select a chat bot with expertise for helping an end user on a particular subject control, for example, how the chat bot communicates with a particular end user. Engaging chat bots 222 with profiles that are catered to specific types of end users may allow more effective communication with such end users. For example, one chat bot may be designed or specialized to engage in a first topic of communication, while another chat bot may be designed or specialized to engage in a second topic of communication that is different from the first topic of communication. In another example, the chat bots 222 may be configured to utilize different dialects or slang, or may have different personality traits or characteristics. For example, the vocabulary of the different chat bots 222 may be tailored to use the slang or diction of young people, elderly people, people in a certain region of the country, and/or people having a certain language or ethnic background. Chat bot 222 may also be referred to herein as one or more chat robots, AI chat bots, automated chat robot, chatterbots, dialog systems, conversational agents, automated chat resources, and/or bots.

A benefit of utilizing automated chat robots for engaging in chat conversations with end users may be that it helps contact centers to more efficiently use valuable and costly resources like human resources, while maintaining end user satisfaction. For example, chat robots may be invoked to initially handle chat conversations without a human end user knowing that it is conversing with a robot. The chat conversation may be escalated to a human resource if and when appropriate. Thus, human resources need not be unnecessarily tied up in handling simple requests and may instead be more effectively used to handle more complex requests or to monitor the progress of many different automated communications at the same time.

It should be appreciated that each of the user input device 102, the network 104, the cloud-based system 106, the end user device 108, and/or the contact center system 110 may be embodied as (or include) one or more computing devices similar to the computing device 300 described below in reference to FIG. 3. For example, in the illustrative embodiment, each of the user input device 102, the network 104, the cloud-based system 106, the end user device 108, and/or the contact center system 110 may include a processing device 302 and a memory 306 having stored thereon operating logic 308 (e.g., a plurality of instructions) for execution by the processing device 302 for operation of the corresponding device.

Figure 3:
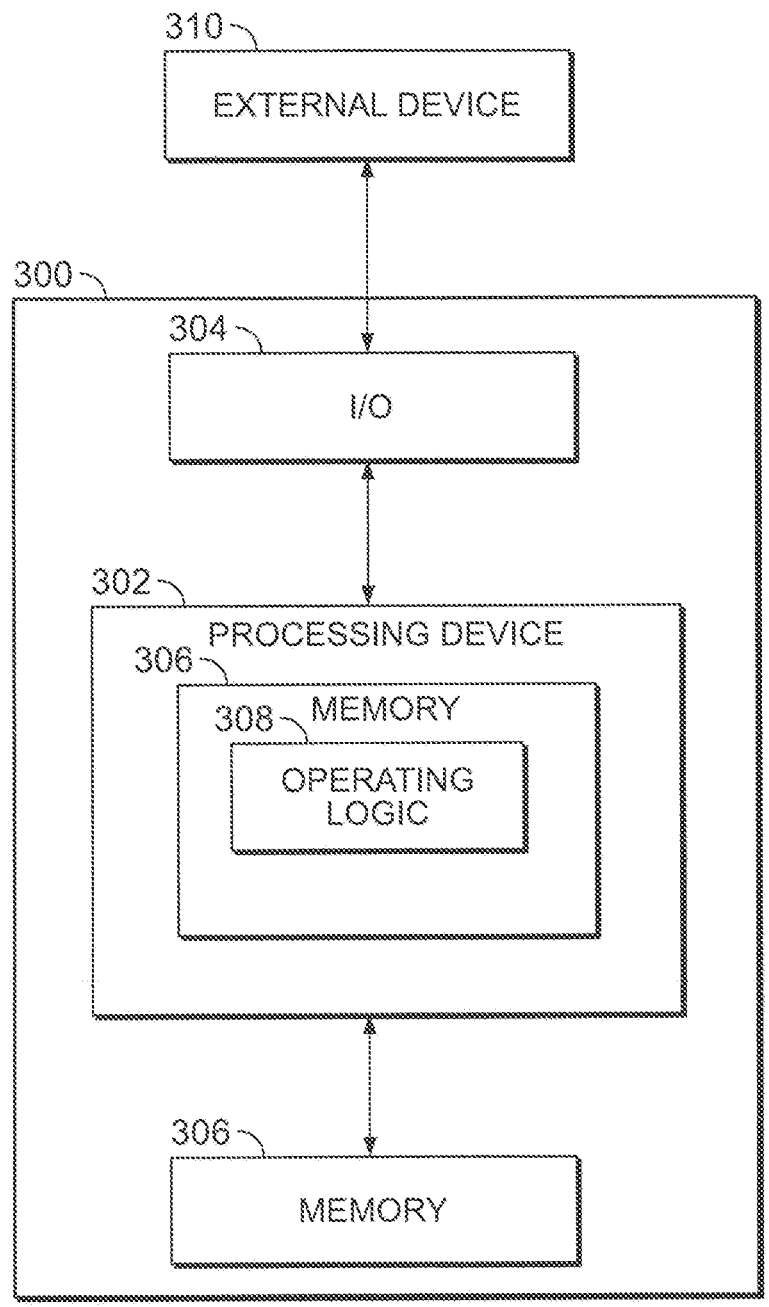
FIG. 3 is a simplified block diagram of at least one embodiment of a computing system.

Referring now to FIG. 3, a simplified block diagram of at least one embodiment of a computing device 300 is shown. The illustrative computing device 300 depicts at least one embodiment of a user input device, cloud-based system, end user device, and/or contact center system that may be utilized in connection with the user input device 102, the network 104, the cloud-based system 106, the end user device 108, and/or the contact center system 110 illustrated in FIG. 1. Further, in some embodiments, one or more of the border communications device 202, the SIP server 204, the resource manager 206, the media control platform 208, the speech/text analytics system 210, the voice signature generator 212, the voice data storage 214, the voice generator 216, the voice gateway 218, the media augmentation system 220, and/or the chat bot 222 (and/or a portion thereof) may be embodied as or executed by a computing device similar to the computing device 300. Depending on the particular embodiment, the computing device 300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the user input device 102, the end user device 108, the cloud-based system 106, the contact center system 110, the border communications device 202, the SIP server 204, the resource manager 206, the media control platform 208, the speech/text analytics system 210, the voice signature generator 212, the voice data storage 214, the voice generator 216, the voice gateway 218, the media augmentation system 220, and/or the chat bot 222. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

Figure 4:
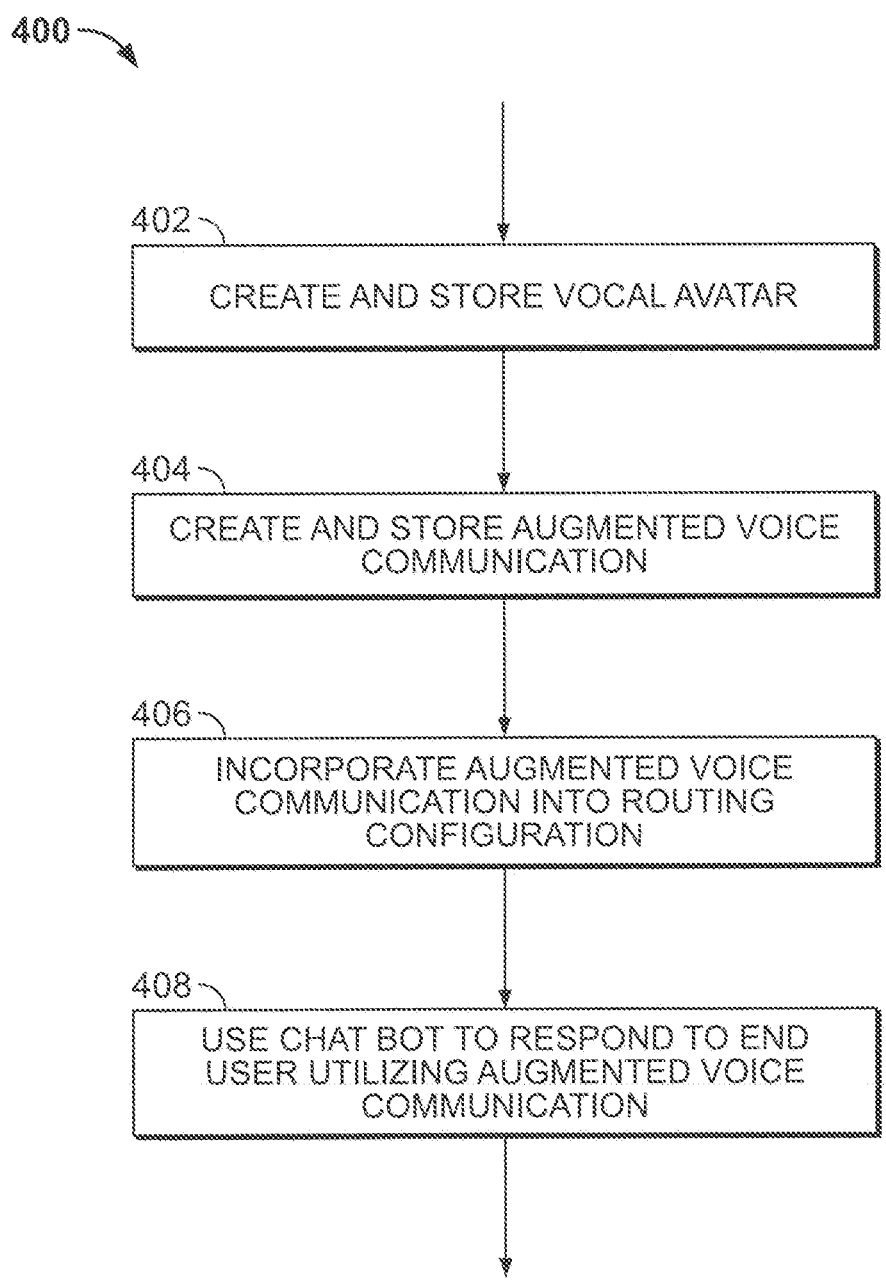
FIG. 4 is a simplified block diagram of at least one embodiment of a method for incorporating an augmented voice communication into a communication routing configuration to be utilized by an automated chat resource for responding to an end user communication using the system of FIG. 1.

Referring now to FIG. 4, in use, the system 100 may execute a method 400 for incorporating an augmented voice communication into a communication routing configuration to be utilized by a chat bot to respond to an end user. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the system 100 (e.g., via the cloud-based system 106 or, more specifically, the voice signature generator 212) may create a vocal avatar and store the created vocal avatar (e.g., in the voice data storage 214). In some embodiments, to do so, the system 100 may execute the method 500 of FIG. 5 described in detail below. In block 404, the system 100 (e.g., via the cloud-based system 106 or, more specifically, the voice generator 216) may use the created vocal avatar to create an augmented voice communication and store the augmented voice communication (e.g., in the voice data storage 214). In some embodiments, to do so, the system 100 may execute the method 600 of FIG. 6 as described in detail below. In block 406, the system 100 (e.g., via the cloud-based system 106) may incorporate the augmented voice communication into a communication routing configuration of the contact center system 110. In some embodiments, to do so, the system 100 may execute the method 700 of FIG. 7 as described in detail below. In block 408, the system 100 (e.g., via the cloud-based system 106) may utilize the chat bot 222 to respond to an end user communication received from the end user device 108 by utilizing the augmented voice communication incorporated into the communication routing configuration of the contact center system 110. In some embodiments, to do so, the system 100 may execute the method 800 of FIG. 8 as described in detail below.

Although the blocks 402-408 are described in a relatively serial manner, it should be appreciated that various blocks of the method 400 may be performed in parallel in some embodiments.

Figure 5:
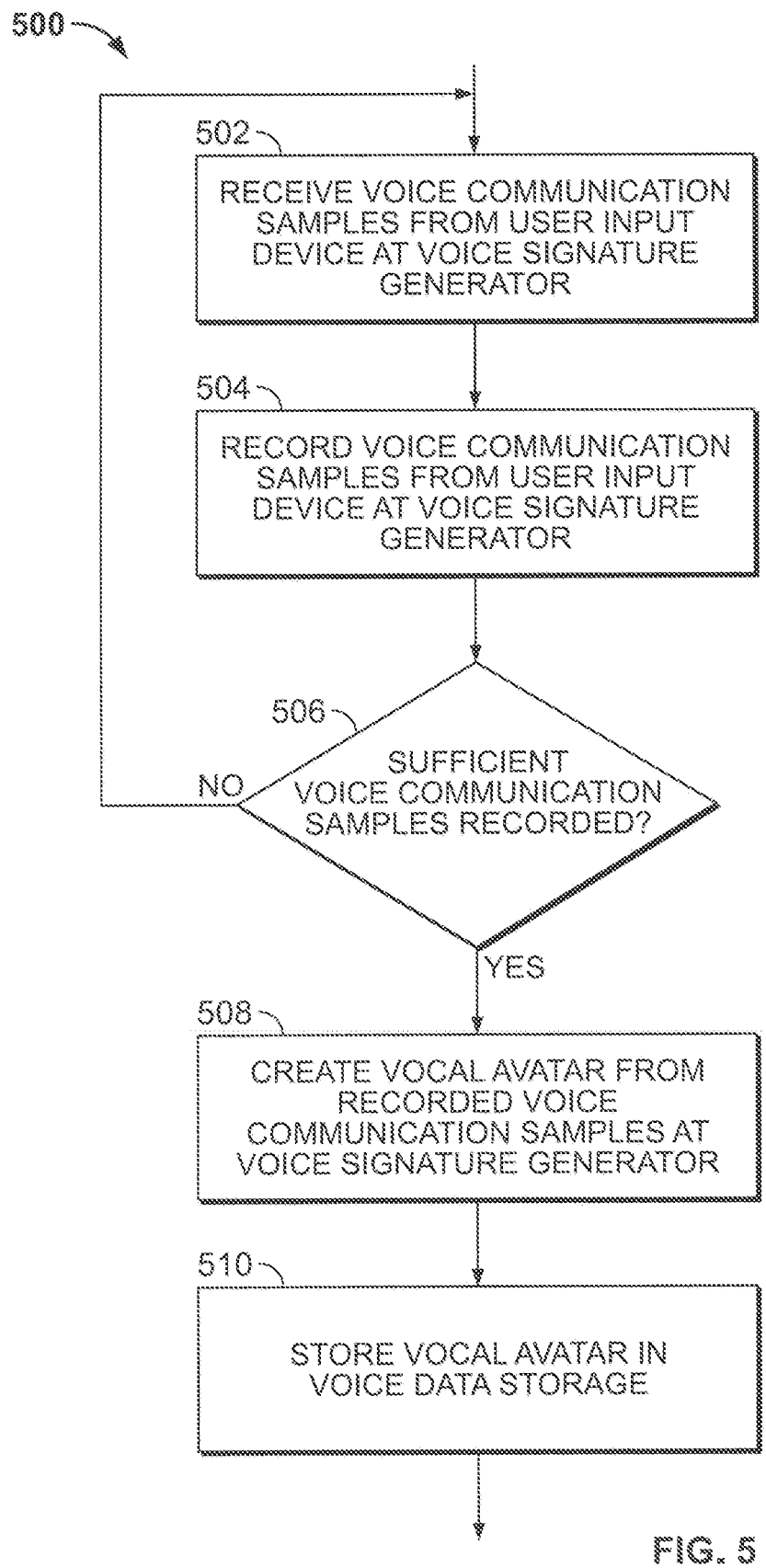
FIG. 5 is a simplified flow diagram of at least one embodiment of a method for creating a vocal avatar using the system of FIG. 1.

Referring now to FIG. 5, in use, the system 100 may execute a method 500 for creating a vocal avatar. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the system 100 (e.g., via the cloud-based system 106) may receive voice communication samples from the user input device 102 at the voice signature generator 212. For example, in some embodiments, an input user may use a graphical user interface such as the graphical user interface 900 of FIGS. 9-11 to provide the relevant voice communication samples. In such embodiments, the system 100 may receive the voice communication samples via a web-based application (e.g., the application 112) or another suitable application. In some embodiments, the voice communication samples may be of an input user's natural voice. In block 504, the voice signature generator 212 may record voice communication samples received from the user input device 102. It should be appreciated that the number of voice communication samples received and recorded for a particular user may vary depending on the particular embodiment. For example, in some embodiments, the voice signature generator 212 may receive and record one voice communication sample. In other embodiments, the voice signature generator 212 may receive and record multiple voice communication samples. In block 506, the voice signature generator 212 may determine whether sufficient voice communication samples have been recorded by the voice signature generator 212 to create a vocal avatar. If the voice signature generator 212 determines that an insufficient number or quality of voice communication samples have been recorded, the method 500 may return to block 502 in which the voice signature generator 212 may receive and record additional voice communication samples. If the voice signature generator 212 determines that sufficient voice communication samples have been recorded, the method 500 may advance to block 508 in which the voice signature generator 212 may create a vocal avatar from the recorded voice communication samples. In some embodiments, a vocal avatar is a digital copy or clone of a particular voice. In some embodiments, the voice is an input user's voice. In some embodiments, the voice is a human's voice. For example, in some embodiments, the vocal avatar is a digital voice that sounds like (e.g., is an accurate representation of) the input user's voice. A vocal avatar may also be referred to herein as synthetic voice, digital voice, synthesized speech, voice clone, cloned speech, voice signature, and/or avatar. In some embodiments, the vocal avatar includes phonetic characteristics having certain values.

In block 510, the cloud-based system 106 may store the created vocal avatar in the voice data storage 214. For example, in some embodiments, an input user may use a graphical user interface such as the graphical user interface 900 of FIG. 12 to store the vocal avatar.

Although the blocks 502-510 are described in a relatively serial manner, it should be appreciated that various blocks of the method 500 may be performed in parallel in some embodiments.

Figure 6:
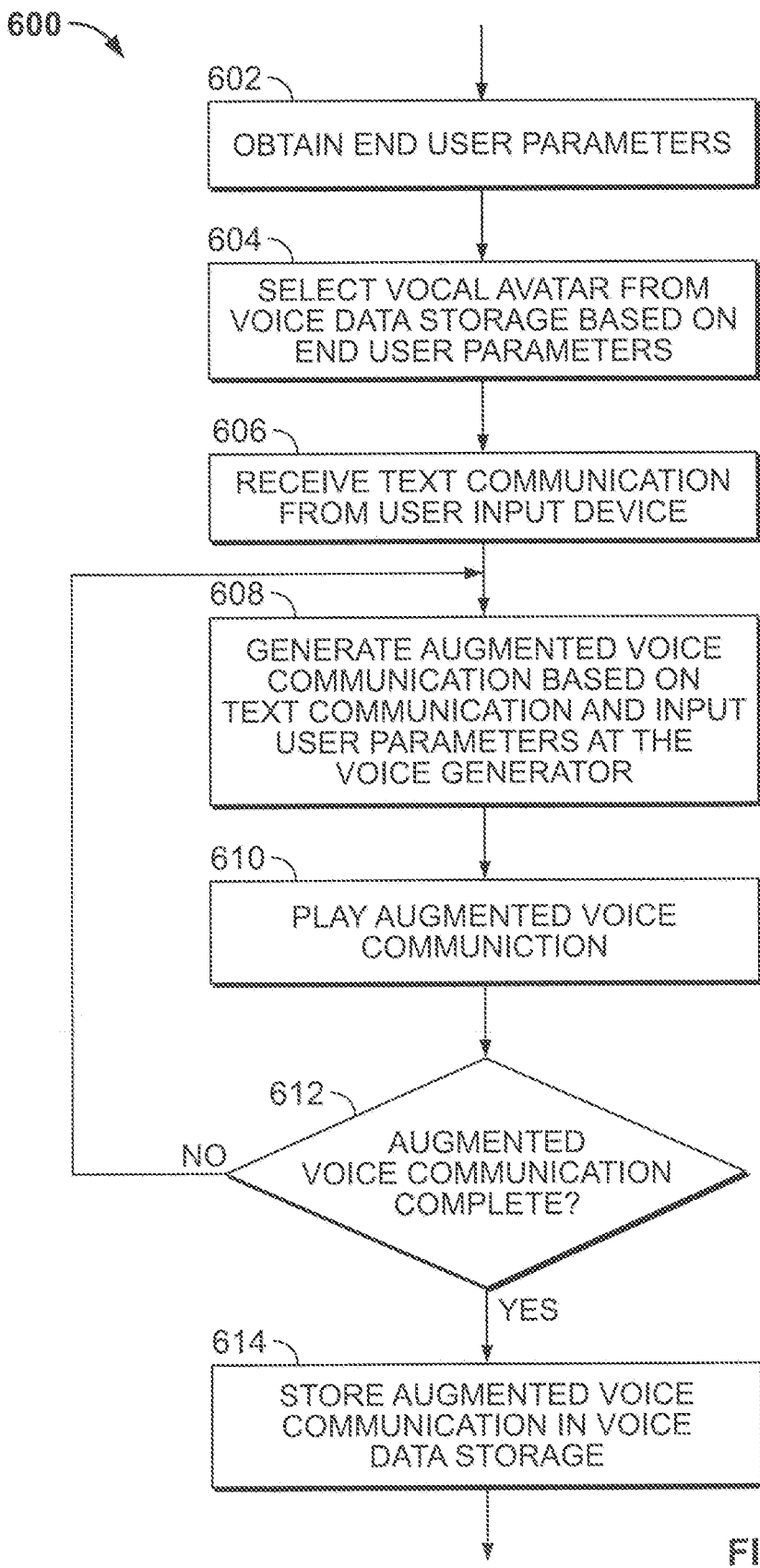
FIG. 6 is a simplified flow diagram of at least one embodiment of a method for creating an augmented voice communication using the system of FIG. 1.

Referring now to FIG. 6, in use, the system 100 may execute a method 600 for creating an augmented voice communication. It should be appreciated that the particular blocks of the method 600 are illustrated by way of example, and such blocks may be combined or divided, added or removed, and/or reordered in whole or in part depending on the particular embodiment, unless stated to the contrary. The illustrative method 600 begins with block 602 in which the system 100 (e.g., via the cloud-based system 106) may obtain end user parameters regarding a particular end user. In some embodiments, the parameters may be profile information corresponding to an end user. In some embodiments, the parameters may be demographic information corresponding to an end user. In some embodiments, the parameters may be at least one of end user location, end user language, end user disabilities (or abilities), end user ethnicity, end user mood, end user gender, end-user age (e.g., young or elderly end user), end user dialects, end user slangs, end user dictions, end user satisfaction, or end user personality traits or characteristics. In some embodiments, block 602 may be omitted such that the cloud-based system 106 does not obtain end user parameters regarding a particular end user.

In block 604, the cloud-based system 106 may select a vocal avatar from the voice data storage 214 based on the end user parameters obtained by the cloud-based system 106. In some embodiments, the vocal avatar may include phonetic characteristics having first values (e.g., a particular speed, a particular pitch, etc.). In some embodiments, an input user may use a graphical user interface such as the graphical user interface 900 of FIG. 9 or 16 to select the vocal avatar. In such embodiments, an input user may select the vocal avatar via a web-based application (e.g., the application 112) or another suitable application. In other embodiments, it should be appreciated that the vocal avatar may be selected without consideration of end user parameters. Accordingly, in such embodiments, the vocal avatar may be selected based on other criteria (e.g., preference of an input user).

Regarding block 606, the cloud-based system 106 may receive a text communication from the user input device. It should be appreciated that an input user may use a graphical user interface such as the graphical user interface 900 of FIGS. 13-14 to enter a text communication. In such embodiments, an input user may enter the text communication via a web-based application (e.g., the application 112) or another suitable application. In some embodiments, the text communication is typewritten by the input user at the user input device 102. The text communication may be words, numbers, or symbols. The text communication may include punctuation.

In block 608, the voice generator 216 may receive the text communication and input user parameters. The voice generator 216 may generate an augmented voice communication utilizing the text communication and input user parameters. The augmented voice communication may sound identical, substantially similar, or similar to the vocal avatar. In some embodiments, an input user may use a graphical user interface such as the graphical user interface 900 of FIGS. 12-13 to generate an augmented voice communication utilizing the text communication and input user parameters. In such embodiments, an augmented voice communication may be generated utilizing the text communication and input user parameters via a web-based application (e.g., the application 112) or other suitable application.

The input user parameters may augment the first values of the phonetic characteristics of the vocal avatar, including, for example, conversation style, pitch, tone, mood, and gestures. In some embodiments, the input user parameters may augment conversation style by changing the conversation style of the initial/first values of the phonetic characteristics of the vocal avatar to at least one of friendly, promotional, conversational, or storytelling. In some embodiments, the input user parameters may augment pitch by augmenting the frequency (e.g., highness or lowness) of the tone. In some embodiments, the input user parameters may augment the frequency of the tone using pitch values from 0 to 100. In such embodiments, pitch values closer to 0 may correspond to lower frequency tones and pitch values closer to 100 may correspond to higher frequency tones (e.g., with a pitch value of 50 corresponding with the original frequency of the vocal avatar). In some embodiments, the input user parameters may augment tone/mood by changing the tone/mood of the initial/first values of the phonetic characteristics of the vocal avatar to at least one of promotional, neutral, angry, happy, or apologetic. In some embodiments, the input user parameters may augment gestures by changing the gestures of the initial/first values of the phonetic characteristics of the vocal avatar to at least one of clapping, whistling, laughing, throat-clearing, tongue clicking, coughing, groaning, or exclaiming (e.g., "oh"!). In some embodiments, the input user may augment the phonetic characteristics in real-time during an end user communication. In some embodiments, the input user may augment the phonetic characteristics before a real-time end user communication. In some embodiments, the phonetic characteristics are augmented based on end user parameters.

In some embodiments, the voice generator 216 may augment a vocal avatar by augmenting the entire text communication or a portion of the text communication. For example, an input user may enter "This is an automated message generated to test our automated call menu" as a text communication into the graphical user interface of the application 112 (see FIG. 14). In such an embodiment, the input user may enter input user parameters via a web-based application (e.g., the application 112) or other application for the entire text communication or portions of the text communication (e.g., "automated message") to augment a vocal avatar by augmenting the entire text communication or a portion thereof (see FIG. 14). It should be appreciated that, in some embodiments, the input user may augment one phonetic characteristic of one portion of the text communication in one way and augment another phonetic characteristic (or the same characteristic) of another portion of the text communication in another way.

In block 610, the user input device 102 may play the augmented voice communication through speakers or other sound systems of the user input device 102. In some embodiments, an input user may use a graphical user interface such as the graphical user interface 900 of FIGS. 13-14 to click play (e.g., play an augmented voice communication). In such embodiments, an input user may click play via a web-based application (e.g., the application 112) or other suitable application.

In block 612, the cloud-based system 106 may determine whether the augmented voice communication is complete. If the cloud-based system 106 determines that the augmented voice communication is not complete, the method 600 may return to block 608 in which the voice generator 216 may generate a second augmented voice communication based on the text communication and new/second input user parameters. In some embodiments, the voice generator 216 may generate a new/second augmented voice communication based on a second text communication and second input user parameters. In some embodiments, the second augmented voice communication may include phonetic characteristics having new/third values. In some embodiments, the first values of the vocal avatar may be different from the third values of the second augmented voice communication. In some embodiments, if the cloud-based system 106 determines that the second augmented voice communication is not complete, the method 600 may return to block 608 and other augmented voice communications may be generated. Any number of additional augmented voice communications may be generated until the cloud-based system 106 determines that an augmented voice communication is complete. If, in block 612, the cloud-based system 106 determines that an augmented voice communication is complete, the cloud-based system 106 may store the augmented voice communication in the voice data storage 214 in block 614. For example, in some embodiments, an input user may use a graphical user interface such as the graphical user interface 900 of FIG. 13 to store the augmented voice communication.

Although the blocks 602-614 are described in a relatively serial manner, it should be appreciated that various blocks of the method 600 may be performed in parallel in some embodiments.

Figure 7:
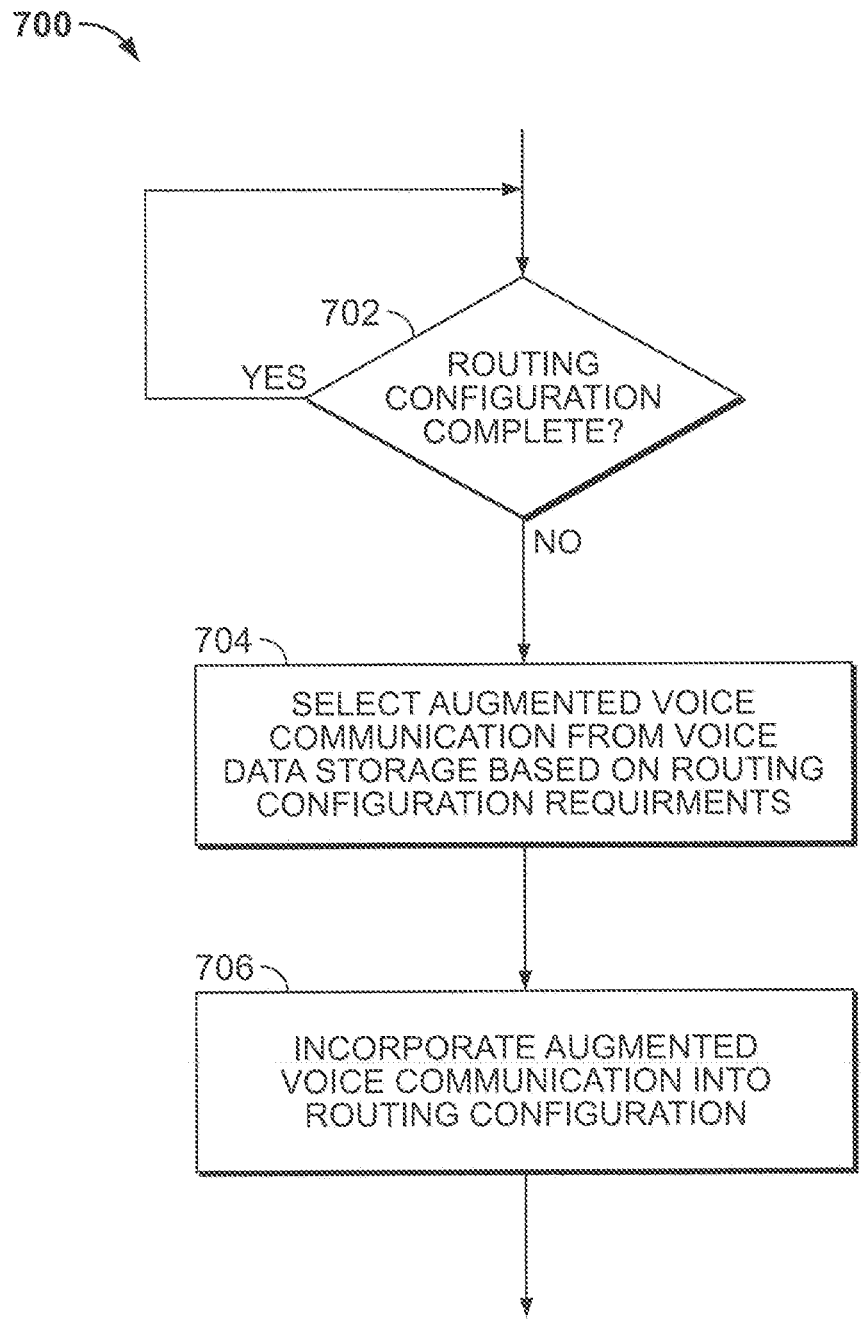
FIG. 7 is a simplified flow diagram of at least one embodiment of a method for incorporating an augmented voice communication into a communication routing configuration using the system of FIG. 1.

Referring now to FIG. 7, in use, the system 100 may execute a method 700 for incorporating an augmented voice communication into a routing configuration. It should be appreciated that the particular blocks of the method 700 are illustrated by way of example, and such blocks may be combined or divided, added or removed, and/or reordered in whole or in part depending on the particular embodiment, unless stated to the contrary. The illustrative method 700 begins with block 702 in which the system 100 (e.g., via the cloud-based system 106) may determine whether the communication routing configuration for the contact center system 110 is complete. If the cloud-based system 106 determines that the communication routing configuration is complete, the method 700 may end or the cloud-based system may continue to determine whether the communication routing configuration for the contact center system 110 is complete (e.g., for subsequent communications). If the cloud-based system 106 determines that the communication routing configuration is not complete, the method 700 may advance to block 704 in which the cloud-based system 106 may select an augmented voice communication from the voice data storage 214 based on communication routing configuration requirements for the contact center system 110. The communication routing configuration requirements may be based on end user communications, end user experience scores, contact center system 110 preferences, and/or other communication routing configuration parameters. The communication routing configuration requirements may include any requirements necessary or desirable to create and maintain a successful communication routing configuration for the contact center system 110. In block 706, the cloud-based system may incorporate the augmented voice communication into the communication routing configuration of the contact center system 110. For example, in some embodiments, an input user may use a graphical user interface such as the graphical user interface 900 of FIG. 15 to incorporate the augmented voice communication into the communication routing configuration of the contact center system 110. Communication routing configuration may also be referred to herein as application flow or interaction flow.

Although the blocks 702-706 are described in a relatively serial manner, it should be appreciated that various blocks of the method 700 may be performed in parallel in some embodiments.

Figure 8:
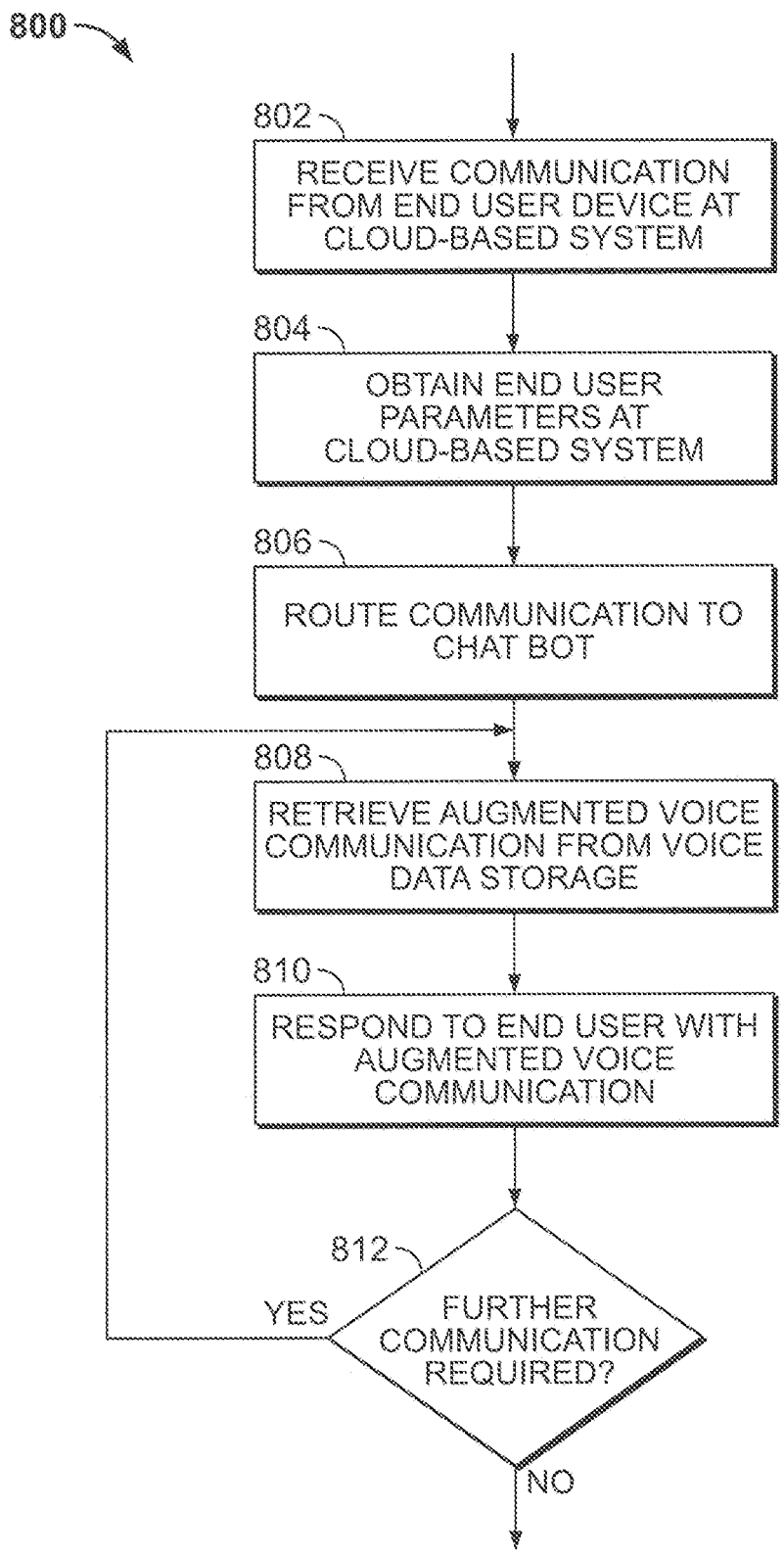
FIG. 8 is a simplified flow diagram of at least one embodiment of a method for employing an automated chat resource to utilize an augmented voice communication in an automated chat communication session with the end user using the system of FIG. 1.

Referring now to FIG. 8, in use, the system 100 (e.g., the cloud-based system 106) may execute a method 800 for incorporating an augmented voice communication into a communication routing configuration to be utilized by a chat bot to respond to an end user. It should be appreciated that the particular blocks of the method 800 are illustrated by way of example, and such blocks may be combined or divided, added or removed, and/or reordered in whole or in part depending on the particular embodiment, unless stated to the contrary. The illustrative method 800 begins with block 802 in which the system 100 (e.g., via the cloud-based system 106) may receive an end user communication from an end user operating the end user device 108. In block 804, the cloud-based system 106 may obtain one or more end user parameters regarding the end user (e.g., from the end user device 108). In block 806, the cloud-based system 106 may route the end user communication to the chat bot 222 based on the one or more end user parameters from the end user device 108. In block 808, the chat bot 222 may retrieve an augmented voice communication from the voice data storage 214. In block 810, the chat bot 222 may use the augmented voice communication to engage in an automated chat communication session with the end user. An automated chat communication session may be a conversation between an end user and chat bot 222. In some embodiments, the automated chat communication session may follow a script of a particular conversation selected by the contact center system 110. In some embodiments, an augmented voice communication may be included within a script. In block 812, the chat bot 222 may determine whether there is further communication with the end user. If the chat bot 222 determines that there is further communication with the end user, the method 800 may return to block 808 in which the chat bot 222 may retrieve another augmented voice communication from the voice data storage 214 and repeat blocks 810-812. In some embodiments, the cloud-based system 106 may monitor the automated chat communication session between the end user and the chat bot 222. In some embodiments, the cloud-based system 106 may redirect the automated chat communication session to a contact center resource other than the chat bot 222 in response to a detected trigger event during the monitoring of the automated chat communication session. In some embodiments, the contact center resource other than the chat bot 222 may be a human resource. In some embodiments, the detected trigger event may be a confidence score regarding the end user. In some embodiments, the confidence score may be associated with at least one of satisfactory answers received to questions asked by the end user, end user dissatisfaction, end user frustration, end user confusion, etc. If the chat bot 222 determines that there is no further communication with the end user, the chat bot 222 may end the automated chat communication session.

Referring back, in some embodiments, block 808 may involve the chat bot 222 selecting a vocal avatar (e.g., including phonetic characteristics having first values) from the voice data storage 214. In such embodiments, the chat bot 222 may use the vocal avatar to generate an augmented voice communication based on a text communication and input user parameters via the voice generator 216. Using the augmented voice communication generated by the chat bot 222, the cloud-based system 106 may respond to an end user with the augmented voice communication generated by the chat bot 222 and determine whether further communication is required in a manner similar to that described above in reference to blocks 810-812 of the method 800. Accordingly, the description of blocks 810-812 are equally applicable and, therefore, have not been repeated for brevity of the description.

Although the blocks 802-812 are described in a relatively serial manner, it should be appreciated that various blocks of the method 800 may be performed in parallel in some embodiments.

FIGS. 9-17 illustrate various possible states of the graphical user interface 900 as an augmented voice communication is generated and incorporated into the communication routing configuration of the contact center system 110. In some embodiments, the graphical user interface 900 may be interacted with by an input user.

Figure 9:
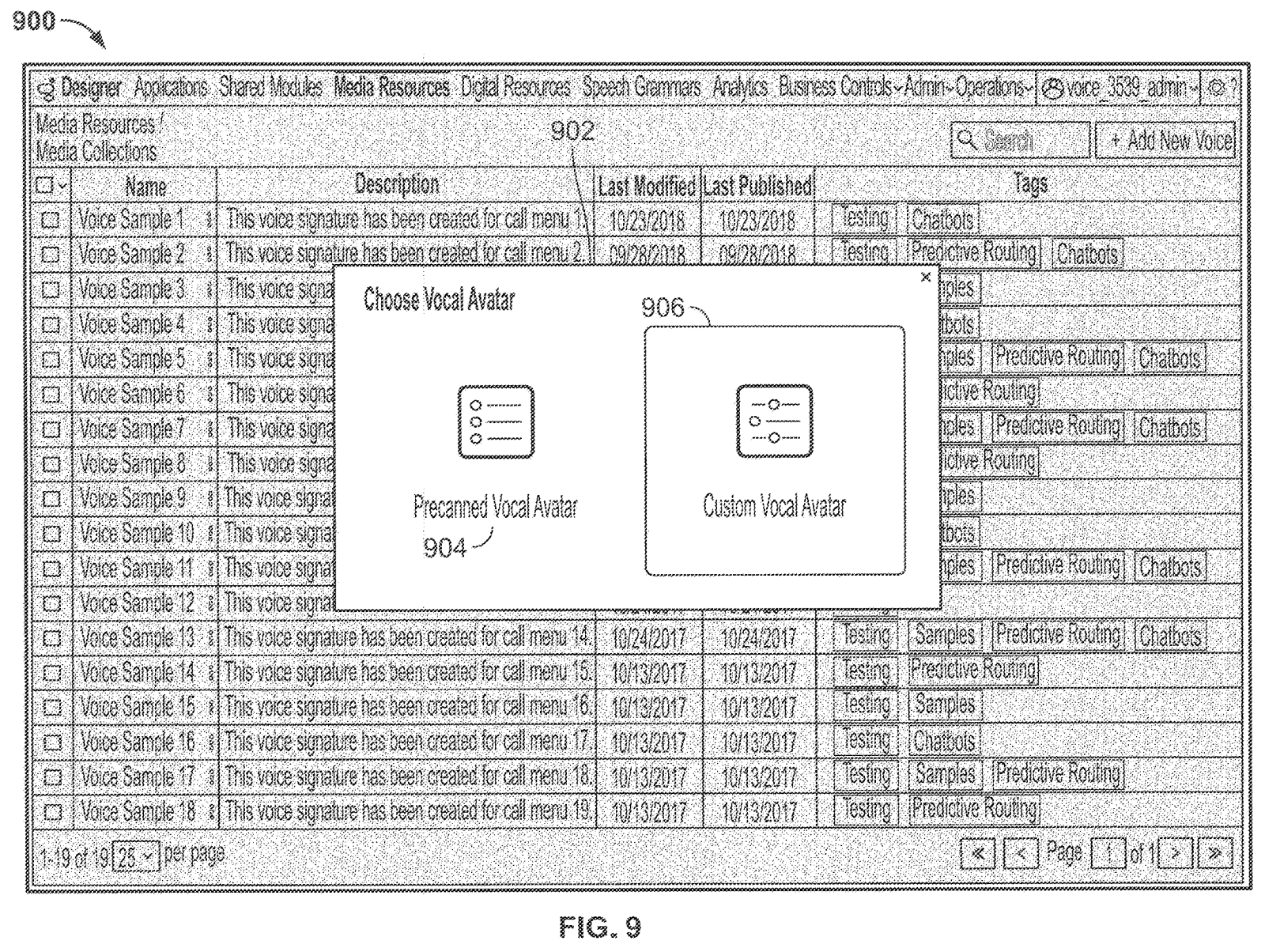
Figure 10:

As shown in FIG. 9, the illustrative graphical user interface 900 may include a "choose vocal avatar" dialog 902 including a "precanned vocal avatar" button 904 and a "custom vocal avatar" button 906. In the illustrative embodiment, the choose vocal avatar dialog 902 may allow the input user to choose a pre-canned vocal avatar (via selection of the button 904) or a custom vocal avatar (via the selection of the button 906). The precanned vocal avatar button 904 may allow the input user to select a previously created vocal avatar. The custom vocal avatar button 906 may allow the input user to create a custom (e.g., new) vocal avatar. In the illustrative embodiment, the input user may click the custom vocal avatar button 906. After the input user clicks the custom vocal avatar button 906, the illustrative graphical user interface 900 may display an "add new vocal avatar" 908 button that indicates that the graphical user interface 900 will allow the input user to create a custom vocal avatar as shown in FIG. 10.

Figure 11:

In some embodiments, the user input device 102 may include a microphone to record audio. After the input user clicks the add new vocal avatar 908 button, the illustrative graphical user interface 900 may allow the input user to speak certain phrases or sentences that may be recorded by a microphone of the input user device as shown in FIG. 11. For example, the add new vocal avatar 908 button may allow the input user to speak a phrase such as "the quick brown fox jumped over the lazy dog," which may be recorded by a microphone. The graphical user interface 900 may allow other assortments of phrases or sentences to be spoken by an input user and recorded by a microphone. After the input user speaks such phrases or sentences, the graphical user interface 900 may allow the input user to click the "previous" button 910 or "next" button 912 to hear the recorded phrases or sentences through speakers or other sound systems of the user input device 102 and/or to navigate through the graphical user interface 900. In the illustrative embodiment, after sufficient phrases or sentences (e.g., voice communication samples) are recorded by the voice signature generator 212 (see blocks 504 and 506 of FIG. 5), the custom vocal avatar may be created by the voice signature generator 212 (see block 508 of FIG. 5) and, in some embodiments, stored in the voice data storage 214 (see block 510 of FIG. 5).

Referring to FIG. 12, the illustrative graphical user interface 900 may allow the user to store the custom vocal avatar in a media collection. The graphical user interface 900 may include multiple voice sample options 914 (e.g., "Voice Sample 1" option 916). The voice sample options 914 may be associated with a particular vocal avatar and may be selected based on the particular needs of the input user. In the illustrative embodiment, the input user may click any one of "Voice Sample 1," "Voice Sample 2," "Voice Sample 3," "Voice Sample 4," "Voice Sample 5," or other available voice sample options.

Figure 13:
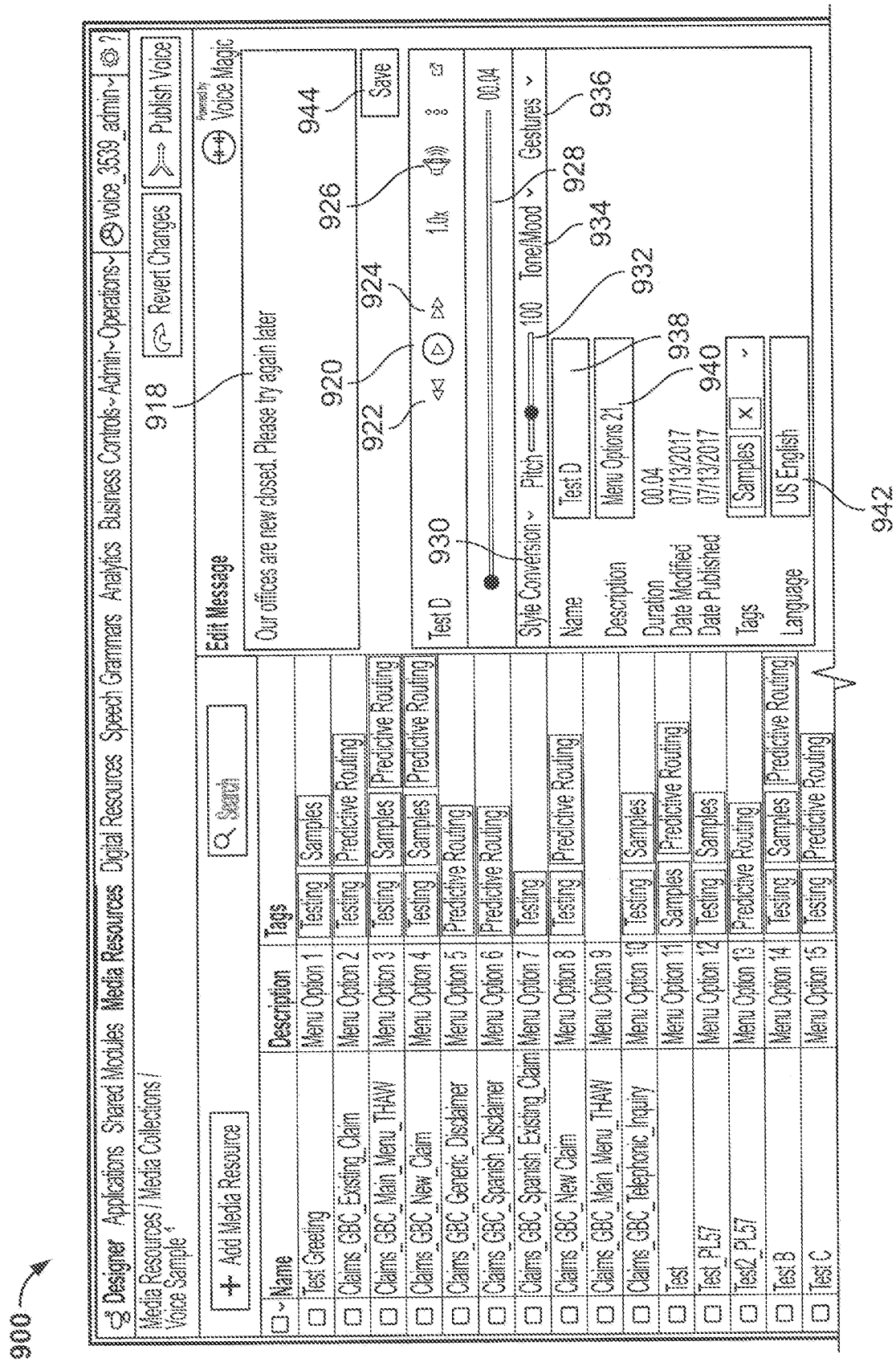
Figure 13:
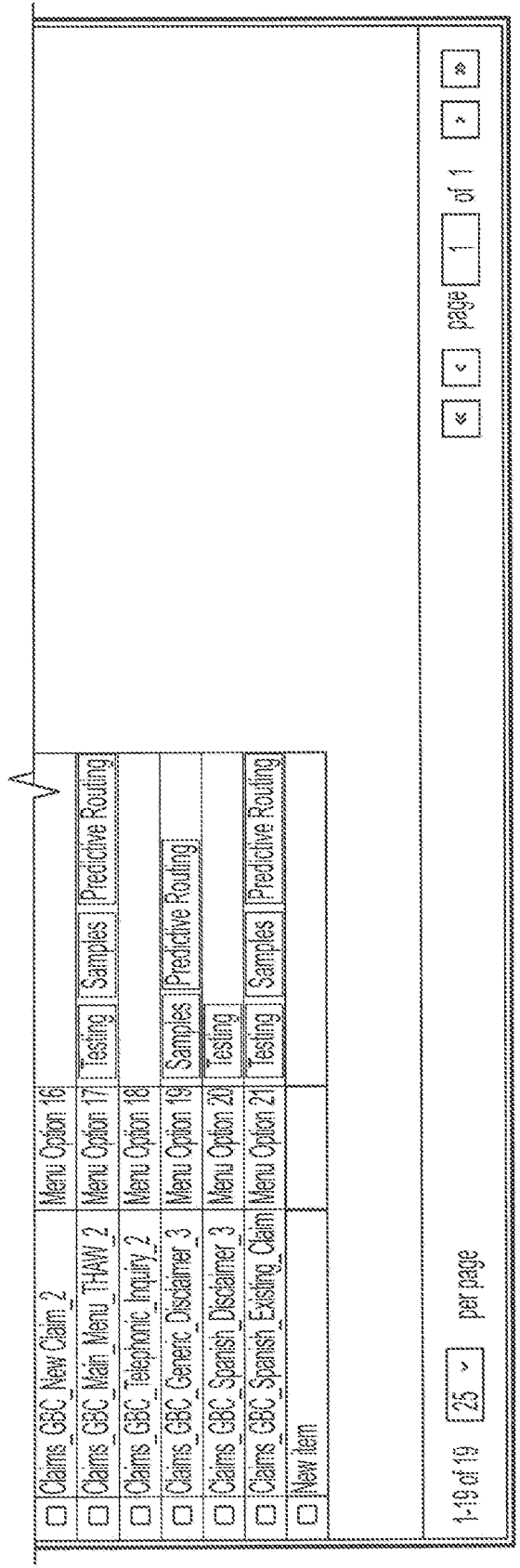

After clicking the "Voice Sample 1" option 916, the illustrative graphical user interface 900 may show Voice Sample 1 and various options for Voice Sample 1 as shown in FIG. 13. As shown in FIG. 13, the graphical user interface 900 may include various options associated with augmenting the selected avatar based on user input including an edit message field 918, a play button 920, a rewind button 922, fast forward button 924, volume button 926, progress bar button 928, style conversation button 930, pitch button 932, tone/mood button 934, gestures button 936, name field 938, description field 940, language button 942, and save button 944. In the illustrative embodiment, the edit message field 918 may allow the input user to provide a relevant text message (e.g., text communication) to be edited by the input user (e.g., see block 606 of FIG. 6). The graphical user interface 900 may allow the user to play an augmented voice communication based on the various input user parameters by clicking the play button 920 (e.g., see blocks 608-610 of FIG. 6). In FIG. 13, the graphical user interface 900 may provide the input user with a rewind button 922 to rewind an augmented voice communication and a fast forward button 924 to move forward through the augmented voice communication at a speed faster than that at which it would usually be played. The graphical user interface 900 may also provide the input user with a volume button 926 to increase or decrease the volume of an augmented voice communication. The graphical user interface 900 may also provide the input user with a progress bar button 928 to visualize the progression of the duration of an augmented voice communication being played. The progress bar button 928 may be utilized by the input user (e.g., clicked or dragged).

Figure 14:
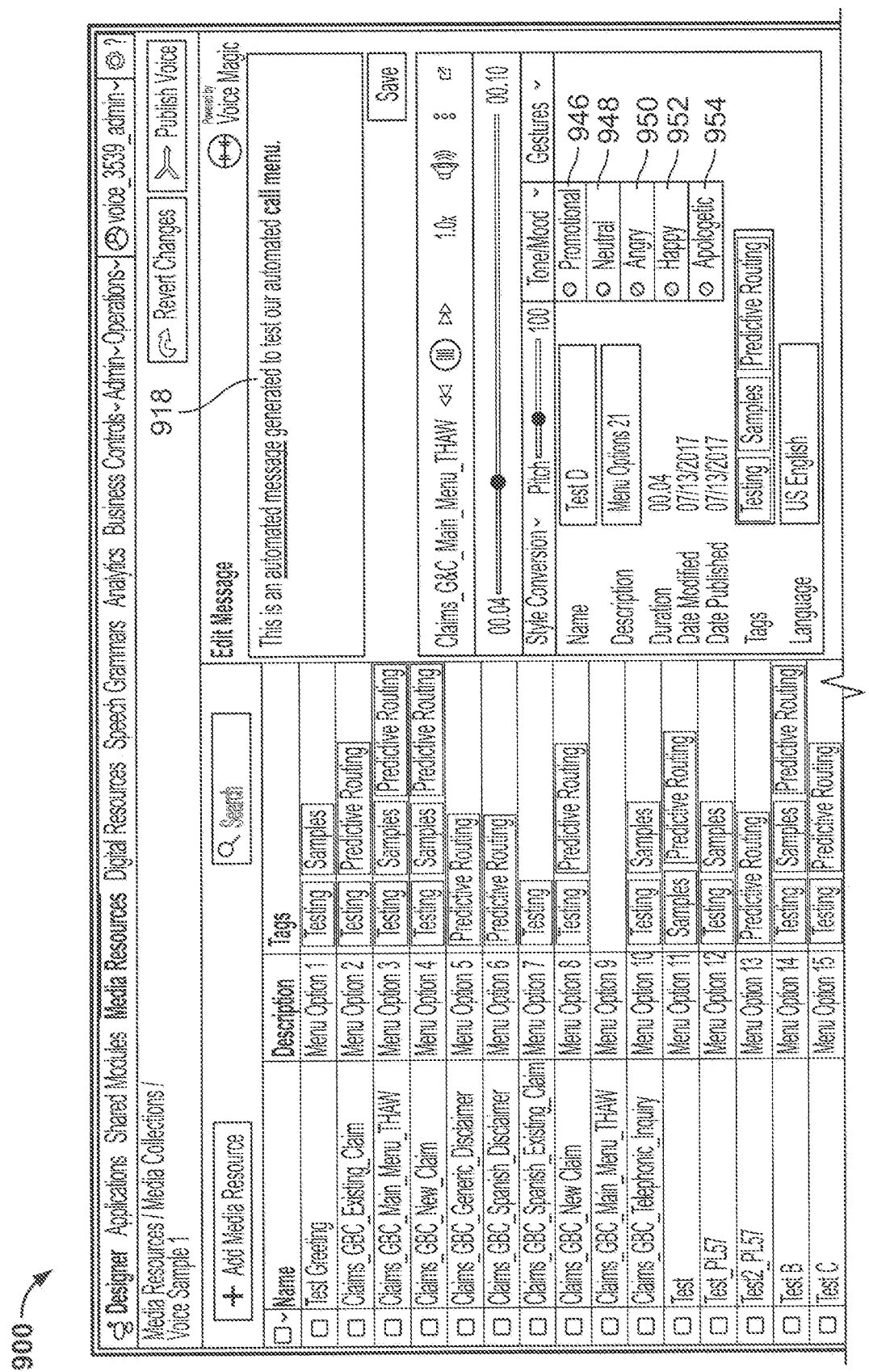

In the illustrative embodiment, the graphical user interface 900 may provide the input user with a "style conversation" button 930, pitch button 932, tone/mood button 934, and gestures button 936 to augment a voice communication. For example, the graphical user interface 900 may provide the input user with a style conversation button 930 to augment the conversation style of an augmented voice communication. The graphical user interface 900 may also provide the input user with a pitch button 932 to adjust the pitch/frequency of an augmented voice communication higher or lower. The graphical user interface 900 may also provide the input user with a tone/mood button 934 to augment the tone or mood of an augmented voice communication. The graphical user interface 900 may also provide the input user with a gestures button 936 to augment the gestures of the augmented voice communication. In the illustrative embodiment, the graphical user interface 900 may allow the input user to utilize one or more of the style conversation button 930, pitch button 932, tone/mood button 934, and/or gestures button 936 to generate an augmented voice communication from a text communication provided by the input user in the edit message field 918. For example, an input user may augment an entire text communication (e.g., "Our offices are now closed. Please try again later") provided by the input user in the edit message field 918. Referring to FIG. 14, in some embodiments, an input user may augment only certain portions of a text communication (e.g., "automated message" and/or "call menu" may be augmented in the following text message: "This is an automated message generated to test our automated call menu") provided by the input user in the edit message field 918. In some embodiments, the graphical user interface 900 allows the input user to augment a single word or phrase or a group of words or phrases of a text communication provided by the input user in the edit message field 918.

Referring back to FIG. 13, the name field 938 may allow an input user to label an augmented voice communication created by the input user with a particular name. The description field 940 may allow an input user to label an augmented voice communication created by the input user with a particular description. The language button 942 may allow an input user to label the augmented voice communication with a particular language. The save button 944 may allow an input user to save the augmented voice communication (e.g., see block 614 of FIG. 6).

As shown in FIG. 14, the illustrative graphical user interface 900 may allow the user to activate the tone/mood button 934. After the input user clicks the tone/mood button 934, various tone/mood menu options may be presented for selection by the input user, including a promotional option 946, neutral option 948, angry option 950, happy option 952, and apologetic option 954. Referring back to FIG. 13, it should be appreciated that the graphical user interface 900 may allow the user to be presented with various buttons after activating any one of the style conversation button 930, pitch button 932, tone/mood button 934, and gestures button 936.

Figure 15:
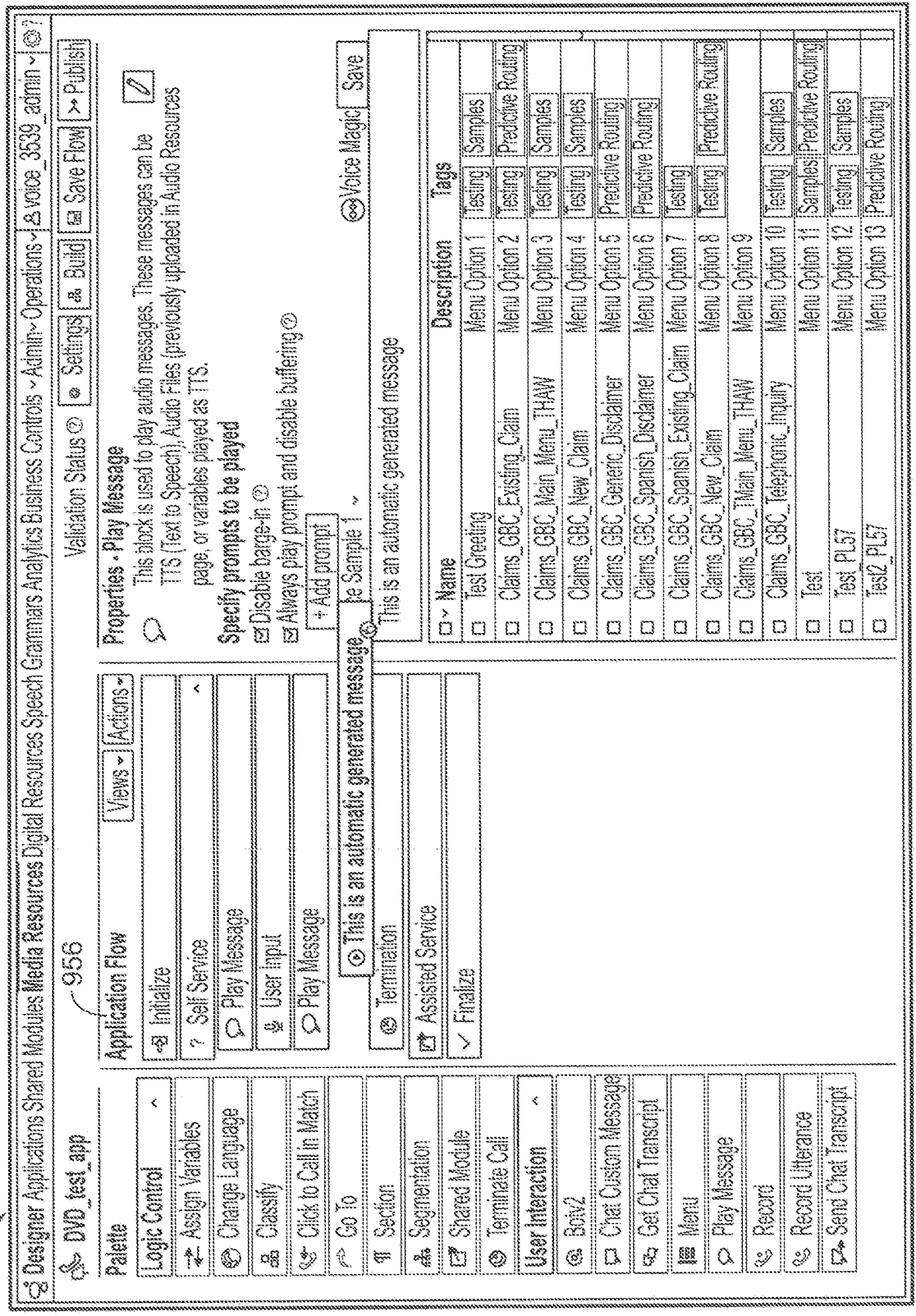
Figure 17:
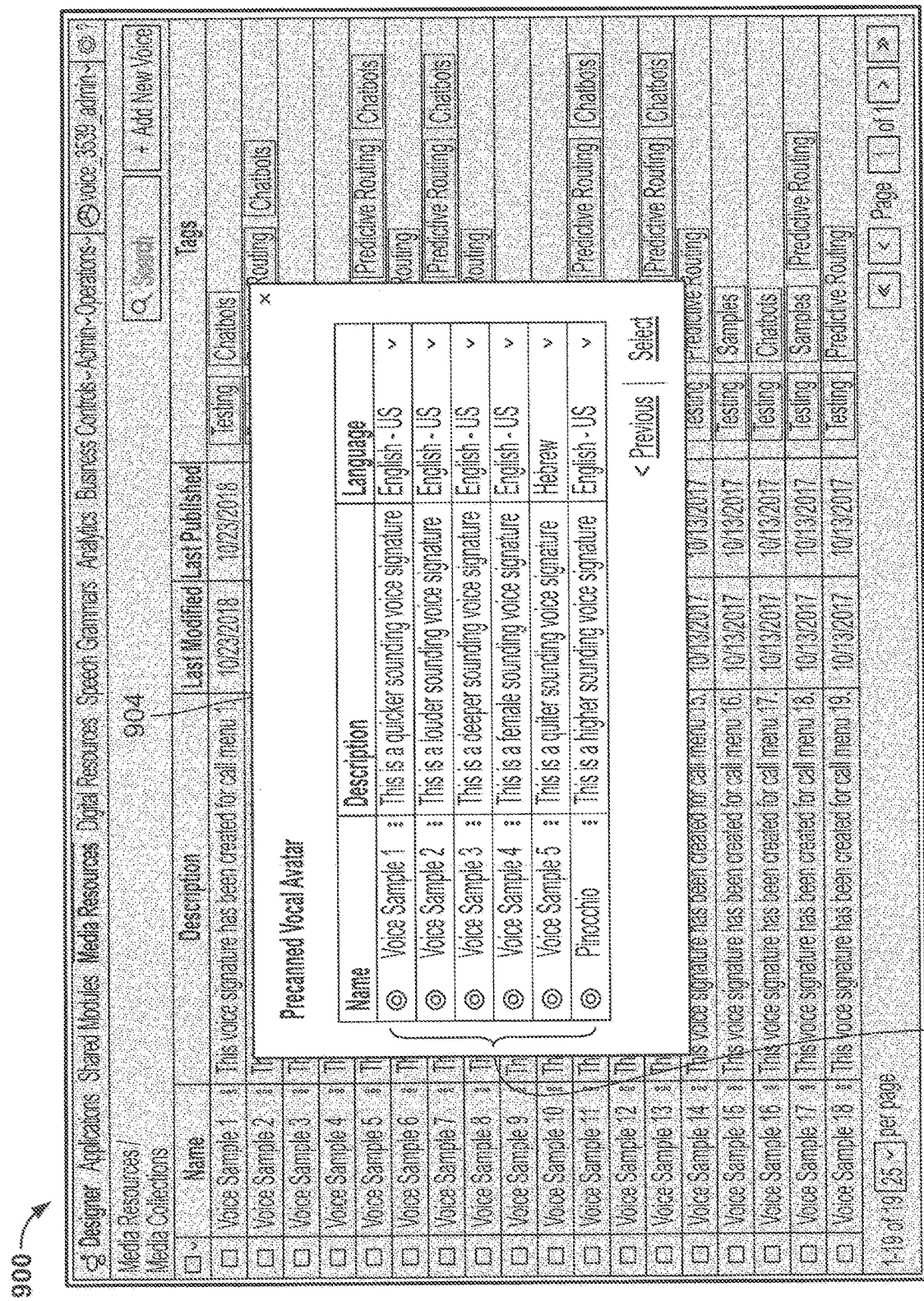

As shown in FIG. 15, the illustrative graphical user interface 900 may include an application flow menu 956. In the illustrative embodiment, the application flow menu 956 may include initialize, self-service, assisted service, and finalize options. The application flow menu 956 may present the input user with several buttons and fields to incorporate an augmented voice communication into the communication routing configuration of a contact center system (e.g., contact center system 110). For example, as described above in reference to block 706 of FIG. 7, the cloud-based system may incorporate the augmented voice communication into the communication routing configuration of the contact center system 110.

Figure 16:
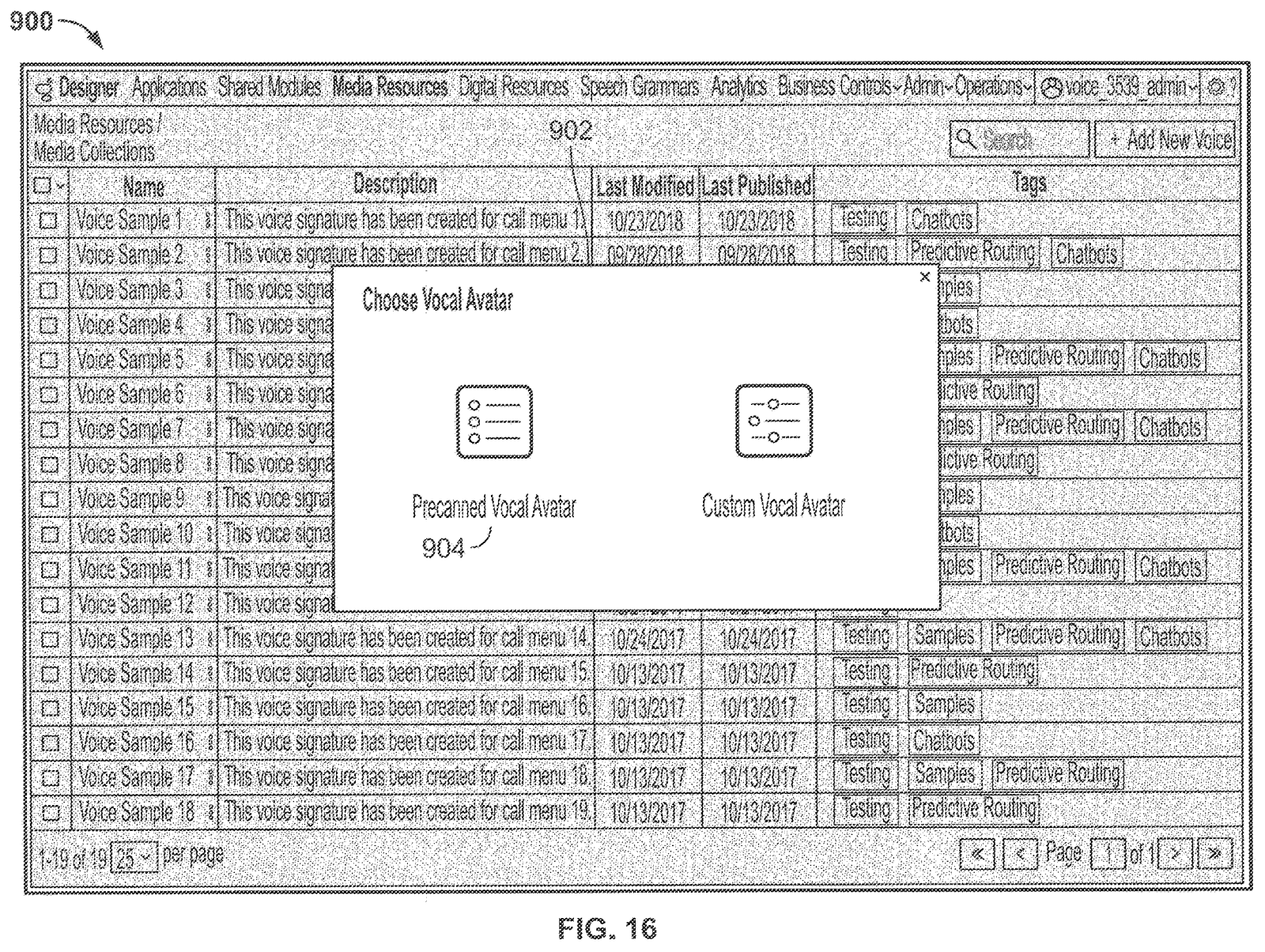

As shown in FIG. 16, the illustrative graphical user interface 900 may include multiple buttons including a choose vocal avatar button 902, a precanned vocal avatar button 904, and a custom vocal avatar button 906. If the input user clicks the precanned vocal avatar button 904, the illustrative graphical user interface 900 may provide several pre-canned vocal avatar samples buttons 958 (e.g., "Voice Sample 1," "Voice Sample 2," "Voice Sample 3," "Voice Sample 4," "Voice Sample 5," and "Pinocchio") for the user's selection. After the input user clicks one of the pre-canned vocal avatar samples buttons 958, the graphical user interface 900 may present buttons, fields, selections and the like to an input user in a manner similar to that described above in reference to FIGS. 12-15. Accordingly, the description of FIGS. 12-15 are equally applicable and, therefore, has not been repeated for brevity of the description. It should be appreciated that the graphical user interface 900 as shown in FIGS. 9-17 may list additional or alternative buttons or text fields in other embodiments.

What is claimed is:

1. A method for incorporating an augmented voice communication into a communication routing configuration of a contact center system, the method comprising:
   selecting a vocal avatar from a plurality of vocal avatars, wherein the vocal avatar has a voice signature and includes phonetic characteristics having first values;
   receiving a text communication and input user parameters from an input user;
   generating the augmented voice communication in response to converting the text communication to a voice communication sounding similar to the vocal avatar and utilizing the input user parameters to augment the first values of the phonetic characteristics of the vocal avatar resulting in the augmented voice communication including phonetic characteristics having second values being different from the first values of the phonetic characteristics of the vocal avatar; and
   incorporating the augmented voice communication into the communication routing configuration of the contact center system.

2. The method of claim 1, further comprising obtaining one or more end user parameters, wherein the vocal avatar is selected in response to obtaining the one or more end user parameters.

3. The method of claim 2, further comprising:
receiving an end user communication from an end user; and
routing the end user communication to an automated chat resource based on the one or more end user parameters, wherein the automated chat resource uses the augmented voice communication to engage in an automated chat communication session with the end user.

4. The method of claim 3, further comprising:
monitoring the automated chat communication session between the end user and the automated chat resource; and
redirecting the automated chat communication session to a contact center resource other than the automated chat resource in response to a trigger event detected during the monitoring of the automated chat communication session.

5. The method of claim 2, wherein the one or more end user parameters comprise profile information or demographic information corresponding to the end user.

6. The method of claim 2, wherein the one or more end user parameters may include at least one of an end user location, an end user language, an end user disabilities, an end user ethnicity, an end user mood, an end user gender, an end user age, an end user dialect, an end user slang, an end user diction, an end user satisfaction, or an end user personality characteristic.

7. The method of claim 1, further comprising:
playing the augmented voice communication;
determining that the augmented voice communication is not complete; and
generating a second augmented voice communication based on second input user parameters in response to determining that the augmented voice communication is not complete, wherein the second augmented voice communication includes phonetic characteristics having third values, and wherein the first values of the phonetic characteristics of the vocal avatar are different from the third values of the phonetic characteristics of the second augmented voice communication.

8. The method of claim 1, wherein the phonetic characteristics comprise at least one of a pitch, a tone, a mood, a gesture, or a conversation style.

9. The method of claim 8, wherein augmenting the first values of the phonetic characteristics of the vocal avatar comprises at least one of augmenting the conversation style by changing the conversation style of the first values to at least one of friendly, promotional, conversational, or storytelling; augmenting the tone by changing the tone of the first values to at least one of promotional, neutral, angry, happy, or apologetic; augmenting the pitch by changing the pitch of the first values to a lower frequency or a higher frequency; and augmenting the gesture by changing the gesture of the first values to at least one of whistling, laughing, throat-clearing, tongue clicking, coughing, groaning, or exclaiming.

10. The method of claim 1, further comprising:
receiving voice communication samples from the input user;
recording the voice communication samples;
determining that sufficient voice communication samples have been recorded; and
creating the vocal avatar from the recorded voice communication samples.

11. A method for incorporating an augmented voice communication into a communication routing configuration of a contact center system, the method comprising:
receiving an end user communication from an end user;
obtaining one or more end user parameters;
routing the end user communication to an automated chat resource based on the one or more end user parameters;
selecting a vocal avatar from a plurality of vocal avatars by the automated chat resource, wherein the vocal avatar has a voice signature and includes phonetic characteristics having first values;
receiving a text communication and input user parameters from the automated chat resource; and
generating the augmented voice communication in response to converting the text communication to a voice communication sounding similar to the vocal avatar and utilizing the input user parameters to augment the first values of the phonetic characteristics of the vocal avatar resulting in the augmented voice communication including phonetic characteristics having second values being different from the first values of the phonetic characteristics of the vocal avatar; and
wherein the automated chat resource uses the augmented voice communication to engage in an automated chat communication session with the end user.

12. The method of claim 11, wherein the phonetic characteristics comprise at least one of a pitch, a tone, a mood, a gesture, or a conversation style.

13. The method of claim 12, wherein augmenting the first values of the phonetic characteristics of the vocal avatar comprises at least one of augmenting the conversation style by changing the conversation style of the first values to at least one of friendly, promotional, conversational, or storytelling; augmenting the tone by changing the tone of the first values to at least one of promotional, neutral, angry, happy, or apologetic; augmenting the pitch by changing the pitch of the first values to a lower frequency or a higher frequency; and augmenting the gesture by changing the gesture of the first values to at least one of whistling, laughing, throat-clearing, tongue clicking, coughing, groaning, or exclaiming.

14. The method of claim 11, further comprising:
monitoring the automated chat communication session between the end user and the automated chat resource; and
redirecting the automated chat communication session to a contact center resource other than the automated chat resource in response to detecting a trigger event during the monitoring of the automated chat communication session.

15. The method of claim 11, wherein selecting the vocal avatar by the automated chat resource comprises selecting the vocal avatar based on machine learning.

16. A system for incorporating an augmented voice communication into a communication routing configuration of a contact center system, the system comprising:
at least one processor; and
at least one memory comprising a plurality of instructions stored thereon that, in response to execution by the at least one processor, causes the system to:
select a vocal avatar from a plurality of vocal avatars, wherein the vocal avatar has a voice signature and includes phonetic characteristics having first values;
receive a text communication and input user parameters from an input user;

generate the augmented voice communication in response to converting the text communication to a voice communication sounding similar to the vocal avatar and utilizing the input user parameters to augment the first values of the phonetic characteristics of the vocal avatar resulting in the augmented voice communication including phonetic characteristics having second values being different from the first values of the phonetic characteristics of the vocal avatar; and incorporate the augmented voice communication into the communication routing configuration of the contact center system.

17. The system of claim 16, further comprising an end user device, and wherein the plurality of instructions further causes the system to:

receive an end user communication from an end user utilizing the end user device;

obtain one or more end user parameters; and route the end user communication to an automated chat resource based on the one or more end user parameters, wherein the automated chat resource uses the augmented voice communication to engage in an automated chat communication session with the end user.

18. The system of claim 17, wherein the plurality of instructions further causes the system to:

monitor the automated chat communication session between the end user and the automated chat resource; and redirect the automated chat communication session to a contact center resource other than the automated chat resource in response to detection of a trigger event while the system monitors the automated chat communication session.

19. The system of claim 17, wherein the one or more end user parameters comprise profile information or demographic information corresponding to the end user.

20. The system of claim 17, wherein the plurality of instructions further causes the system to:

receive voice communication samples from the input user;

record the voice communication samples;

determine that sufficient voice communication samples have been recorded; and create the vocal avatar from the recorded voice communication samples.

* * * * *